(12) United States Patent
Claridge et al.

(10) Patent No.: US 12,157,786 B2
(45) Date of Patent: Dec. 3, 2024

(54) SPHERICAL PARTICLES COMPRISING CARBON NANOMATERIAL-GRAFT-POLYURETHANE AND METHODS OF PRODUCTION AND USES THEREOF

(71) Applicant: Xerox Corporation, Norwalk, CT (US)

(72) Inventors: Robert Claridge, Kitchener (CA); Valerie M. Farrugia, Oakville (CA); Shivanthi Easwari Sriskandha, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 17/321,877

(22) Filed: May 17, 2021

(65) Prior Publication Data
US 2022/0363800 A1  Nov. 17, 2022

(51) Int. Cl.
| | | |
|---|---|---|
| *C08F 292/00* | (2006.01) | |
| *B29C 64/153* | (2017.01) | |
| *B29C 64/268* | (2017.01) | |
| *B33Y 10/00* | (2015.01) | |
| *B33Y 30/00* | (2015.01) | |
| *B33Y 40/00* | (2020.01) | |
| *B33Y 70/00* | (2020.01) | |
| *B33Y 70/10* | (2020.01) | |
| *C08G 18/10* | (2006.01) | |
| *C08G 18/32* | (2006.01) | |
| *C08G 18/40* | (2006.01) | |
| *C08G 18/42* | (2006.01) | |
| *C08G 18/48* | (2006.01) | |
| *C08G 18/76* | (2006.01) | |
| *C08G 83/00* | (2006.01) | |
| *C08K 3/04* | (2006.01) | |
| *C08K 9/08* | (2006.01) | |
| *C08L 75/04* | (2006.01) | |
| *C08L 75/08* | (2006.01) | |
| *C08L 101/00* | (2006.01) | |
| *C08G 18/24* | (2006.01) | |
| *C08G 18/66* | (2006.01) | |

(52) U.S. Cl.
CPC .......... *C08F 292/00* (2013.01); *B29C 64/268* (2017.08); *B33Y 30/00* (2014.12); *B33Y 40/00* (2014.12); *B33Y 70/00* (2014.12); *B33Y 70/10* (2020.01); *C08G 18/10* (2013.01); *C08G 18/3206* (2013.01); *C08G 18/4018* (2013.01); *C08G 18/4238* (2013.01); *C08G 18/4277* (2013.01); *C08G 18/4825* (2013.01); *C08G 18/76* (2013.01); *C08G 18/7671* (2013.01); *C08G 83/001* (2013.01); *C08K 3/04* (2013.01); *C08L 75/04* (2013.01); *C08L 75/08* (2013.01); *C08L 101/00* (2013.01); *B29C 64/153* (2017.08); *B33Y 10/00* (2014.12); *C08G 18/246* (2013.01); *C08G 18/4854* (2013.01); *C08G 18/6607* (2013.01); *C08K 3/042* (2017.05); *C08K 9/08* (2013.01)

(58) Field of Classification Search
CPC ..... B29C 64/268; B29C 64/153; B33Y 70/10; B33Y 30/00; B33Y 40/00; B33Y 10/00; C08F 292/00; C08G 83/001; C08G 18/10; C08G 18/7671; C08G 18/3206; C08G 18/4018; C08G 18/4238; C08G 18/4277; C08G 18/4825; C08G 18/76; C08G 18/246; C08G 18/4854; C08G 18/6607; C08K 3/04; C08K 3/042; C08K 9/08; C08L 75/08; C08L 75/04; C08L 101/00
See application file for complete search history.

(56) References Cited

U.S. PATENT DOCUMENTS

2021/0070993 A1* 3/2021 Farrugia ................ C08G 69/14

FOREIGN PATENT DOCUMENTS

| CN | 103319724 | | 9/2013 |
|---|---|---|---|
| CN | 103980609 | | 8/2014 |
| CN | 104910609 | * | 9/2015 |

(Continued)

OTHER PUBLICATIONS

Machine English translation of CN 104910609, Xia et al., Sep. 2015.*
Machine English translation of DE 102018003274, Pretsch et al., Oct. 2019.*
Machine English translation of JP 2006-321711, Sugano et al., Nov. 2006.*
Extended European Search Report for corresponding EP Application No. 22170381.2 mailed Sep. 20, 2022.
Hohimer Cameron J et al: "Electrical conductivity and piezoresistive response of 3D printed thermoplastic polyurethane/multiwalled carbon nanotube composites", Proceedings of SPIE; [Proceedings of SPIE ISSN 0277-786X vol. 10524], SPIE, US, vol. 10596, Mar. 22, 2018 (Mar. 22, 2018), pp. 105960J-105960J, XP060102310, DOI: 10.1117/12.2296774; ISBN: 978-1-5106-1533-5 Chapters 2.1 and 2.2.

(Continued)

*Primary Examiner* — Patrick D Niland
(74) *Attorney, Agent, or Firm* — Vorys, Sater, Seymour and Pease LLP

(57) ABSTRACT

A nonlimiting example method of forming highly spherical carbon nanomaterial-graft-polyurethane (CNM-g-polyurethane) particles may comprising: mixing a mixture comprising: (a) carbon nanomaterial-graft-polyurethane (CNM-g-polyurethane), wherein the CNM-g-polyurethane particles comprises: a polyurethane grafted to a carbon nanomaterial, (b) a carrier fluid that is immiscible with the polyurethane of the CNM-g-polyurethane, optionally (c) a thermoplastic polymer not grafted to a CNM, and optionally (d) an emulsion stabilizer at a temperature greater than a melting point or softening temperature of the polyurethane of the CNM-g-polyurethane and the thermoplastic polymer, when included, and at a shear rate sufficiently high to disperse the CNM-g-polyurethane in the carrier fluid; cooling the mixture to below the melting point or softening temperature to form CNM-g-polyurethane particles; and separating the CNM-g-polyurethane particles from the carrier fluid.

19 Claims, 2 Drawing Sheets

(56) References Cited

FOREIGN PATENT DOCUMENTS

| | | | | |
|---|---|---|---|---|
| CN | 105315456 | | 2/2016 | |
| CN | 106633373 | | 5/2017 | |
| DE | 102018003274 | * | 10/2019 | |
| EP | 1876195 A2 | * | 1/2008 | ............ B01F 13/103 |
| EP | 3760412 | | 1/2021 | |
| JP | 2006-321711 | * | 11/2006 | |
| JP | 2020002247 | | 1/2020 | |
| WO | WO 2014/210584 | * | 12/2014 | |

OTHER PUBLICATIONS

Akbar, S., Beyou, E., Chaumont, P., Mazzolini, J., Espinosa, E., D'agosto, F. and Boisson, C. (2011), Synthesis of polyethylene-grafted multiwalled carbon nanotubes via a peroxide-initiating radical coupling reaction and by using well defined TEMPO and thiol end-functionalized polyethylenes. J. Polym. Sci. A Polym. Chem., 49: 957-965.

Yang, B.-X., Pramoda, K., Xu, G. and Goh, S. (2007), Mechanical Reinforcement of Polyethylene Using Polyethylene-Grafted Multiwalled Carbon Nanotubes. Adv. Funct. Mater., 17: 2062-2069.

Redzic, E., Garoff, T., Mardare, C.C. et al. Heterogeneous Ziegler-Natta catalysts with various sizes of $MgCl_2$ crystallites: synthesis and characterization. Iran Polym J 25, 321-337 (2016).

Huanmin Li, Xu-Ming Xie. Polyolein-functionalized graphene oxide and its GO/HDPE nanocomposite with excellent mechanical properties[J]. Chin. Chem. Lett., 2018, 29(1): 161-165.

Kausar, A. Polyamide-grafted-multi-walled carbon nanotube electrospun nanofibers/epoxy composites. Fibers Polymer 15, 2564-2571 (2014).

* cited by examiner

SPHERICAL PARTICLES COMPRISING CARBON NANOMATERIAL-GRAFT-POLYURETHANE AND METHODS OF PRODUCTION AND USES THEREOF

FIELD

The present disclosure relates to highly spherical particles that comprises carbon nanomaterial-graft-polyurethane (CNM-g-polyurethane). The present disclosure further relates to compositions, synthesis methods, and applications of such particles (also referred to herein as CNM-g-polyurethane particles).

BACKGROUND

Thermoplastic polymers are often used to make extruded objects like films, bags, particles, and filaments. One example of a thermoplastic polymer is a polyurethane. Polyurethanes have the ability to withstand elevated or low temperatures without loss of physical properties. Polyurethanes are high performance elastomeric materials that combine the flexibility of rubber with toughness and durability. They have multiple applications in automotive (e.g., seats, armrests, headrests, glaze windshields and windows), medicine (e.g., catheter, general purpose tubing, hospital bedding, surgical drapes, wound dressings, injection molded devices medical implants, medical devices), adhesives, sealants, filters, footwear components, wire sheaths, protective apparel, computer components, aerospace components and parts. Thermoplastic elastomers are copolymers with crystalline "hard" segments and amorphous "soft" segments. Polyurethanes are thermoplastic elastomers prepared by the polymerization of isocyanates, polyols, and chain extenders. The soft segments are typically polyols with a low glass transition temperature which impart flexibility to the polymer material. The hard segments are typically urethanes with chain extenders which provide toughness.

Therefore, objects formed with thermoplastic polymers such as the polyurethanes can be used in demanding applications like power tools, automotive parts, gears, and appliance parts. Three-dimensional (3-D) printing, also known as additive manufacturing, is increasingly used to produce such objects. Selective laser sintering has enabled the direct manufacture of three-dimensional objects of high resolution and dimensional accuracy from a variety of materials including polystyrene, NYLON, other plastics, and composite materials, such as polymer coated metals and ceramics.

Polyurethane is one of the most common polymers used in additive manufacturing because of its flow properties, lower cost than other polymers, and desirable sintering window. However, physical properties needed in objects produced by additive manufacturing may be beyond those of a polyurethane. Expanding the methods by which polyurethane-carbon nanomaterial composites can be manufactured into objects would further expand the polymer composite industry.

SUMMARY

The present disclosure relates to highly spherical particles that comprises CNM-g-polyurethane. The present disclosure further relates to compositions, synthesis methods, and applications of such CNM-g-polyurethane particles.

Disclosed herein are methods of selective laser sintering that comprise: depositing CNM-g-polyurethane particles optionally in combination with other thermoplastic polymer particles onto a surface, wherein the CNM-g-polyurethane particles comprise a polyurethane grafted to a carbon nanomaterial (CNM); and once deposited, exposing at least a portion of the CNM-g-polyurethane particles to a laser to fuse the polymer particles thereof and form a consolidated body by selective laser sintering.

Disclosed herein are methods that comprise: mixing a mixture comprising: (a) carbon nanomaterial-graft-polyurethane (CNM-g-polyurethane), wherein the CNM-g-polyurethane particles comprises: a polyurethane grafted to a carbon nanomaterial, (b) a carrier fluid that is immiscible with the polyurethane of the CNM-g-polyurethane, optionally (c) a thermoplastic polymer not grafted to a CNM, and optionally (d) an emulsion stabilizer at a temperature greater than a melting point or softening temperature of the polyurethane of the CNM-g-polyurethane and the thermoplastic polymer, when included, and at a shear rate sufficiently high to disperse the CNM-g-polyurethane in the carrier fluid; cooling the mixture to below the melting point or softening temperature to form CNM-g-polyurethane particles; and separating the CNM-g-polyurethane particles from the carrier fluid.

BRIEF DESCRIPTION OF THE DRAWINGS

The following figure is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
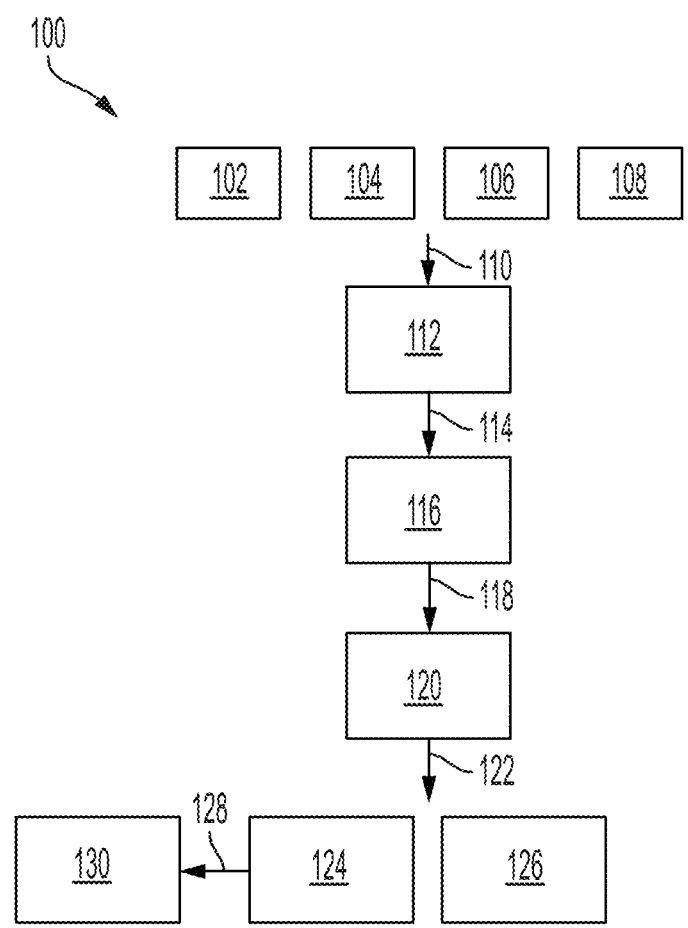
FIG. 1 is a flow chart of a nonlimiting example method of the present disclosure.

The present disclosure relates to highly spherical particles that comprises carbon nanomaterial-grafted-polyurethane (CNM-g-polyurethane). The present disclosure further relates to compositions, synthesis methods, and applications of such CNM-g-polyurethane particles.

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS).

Powder particulates usable in 3-D printing include thermoplastic polymers, including thermoplastic elastomers, metals, and other solidifiable substances. When using a composites in 3-D printing, the particulates (e.g., the carbon nanomaterial of a polyurethane-carbon nanomaterial composites) should be evenly dispersed throughout the small melted droplets or the powder particulate, or the distribution of the particulates of the final object will be uneven. Accordingly, the properties (e.g., strength and/or electrical conductivity) of the object may also be irregular, which may introduce points of failure to the object.

The present disclosure relates to highly spherical particles that comprises carbon nanomaterial-graft-polyurethane (CNM-g-polyurethane). Advantageously, the compositions and methods of the present disclosure use in situ polymerization of the polyurethanes. Therefore, the desirable melt and flow properties of the polyurethanes may be exploited during the additive manufacturing methods. The CNM-g-polyurethane particles may be useful, among other things, as starting material for additive manufacturing (e.g., automotive parts, aerospace/aircraft-related parts, shoe soles, etc.), especially SLS 3-D printing.

Methods of selective laser sintering described herein comprise: depositing carbon nanomaterial-graft-polyurethane (CNM-g-polyurethane) particles optionally in combination with other thermoplastic polymer particles onto a surface, wherein the CNM-g-polyurethane comprises a polyurethane grafted to a carbon nanomaterial (CNM); and once deposited, exposing at least a portion of the CNM-g-polyurethane particles to a laser to fuse the polymer particles thereof and form a consolidated body by selective laser sintering. The carbon nanomaterials (CNMs) may improve the physical properties and/or impart new physical properties to the object produced by additive manufacturing. Further, by using CNM-g-polyurethane, the CNMs may be well dispersed and/or distributed through in the polymer particles. Therefore, the carbon nanomaterials may be well dispersed and/or distributed through the object (or portion thereof) that is produced by additive manufacturing.

Further, the present disclosure relates to polyurethane thermoplastic polymer composites that are covalently bound to CNMs such as carbon nanotubes (CNTs) and methods of preparing highly spherical CNM-g-polyurethane particles from the said polyurethane thermoplastic polymer composites. Nonlimiting example of CNTs may include single walled carbon nanotubes (SWCNT), multi-walled (MWCNT), double-walled (DWCNT). In some instances, CNMs may be hydroxyl-, carboxyl-, or amide-functionalized CNMs (e.g., MWCNTs). Namely, hydroxyl-functionalized CNMs may be produced via acid treatment of the surface of the CNMs to generate hydroxyl groups on the surface. Further, carboxyl-functionalized CNMs may be produced via microwave radiation of CNMs using concentrated acids.

The covalent modification of CNTs with functional groups (e.g., hydroxyl group, amino group, or carboxylic acid) may be further reacted with monomer units, oligomers, or directly reacted to a longer polymer chain of polyurethane to improve the dispersion capabilities of the CNTs within the polymer matrix and be readily integrated within the polymer to form the corresponding polyurethane thermoplastic polymer nanocomposite.

For example, CNM-g-polyurethanes may be produced by reacting amide-functionalized CNM (e.g., MWCNT) with polyurethanes, wherein the amide groups may be inserted into the hard segment of the polyurethanes via a glycol (e.g., polyoxytetramethylene glycol (PTMO)) and a diisocyanate (e.g., toluene diisocyanate (TDI)).

Alternatively, CNM-g-polyurethanes may be produced by reacting CNM (e.g., MWCNT) with polyurethanes via sol-gel process with silsesquioxanes-like formation wherein polyurethane-urea and CNM may be combined.

In another example, CNM-g-polyurethanes may be produced by reacting both —OH and —COOH functionalized CNM and polyurethanes by an in situ coupling reaction using hydroxyl-terminated linear polymer diols (e.g., poly (butadiene-co-acrylonitrile) oligomer (HTBN)) as soft segments, 1,6-hexamethylene diisocyanate (HDI) and different chain extenders as hard segments.

In yet another example, CNM-g-polyurethanes may be produced by CNM attached to hyperbranched polyurethane which may be prepared by reacting polyol used as the soft segment (e.g., poly(ε-caprolactone)diol), a diisocyanate as a hard segment (e.g., 4,4'-methylene bis(phenylisocyanate), oil (e.g., castor oil), and chain extender. A chemically modified CNM (e.g., functionalized MWCNT) may be dispersed in DMF and added to the reaction mixture comprising the polyol, the diisocyanate, oil, and the chain exchanger, to obtain the polyurethane composite.

In yet another example, CNM-g-polyurethanes may be produced via acid treatment of the surface of a CNM to generate hydroxyl groups on the surface, which may then be reacted with an acryloyl halide (e.g., poly(acryloyl chloride (PACl)) to obtain an encapsulation. The outer layer may have an abundance of acryloyl halide groups (e.g., acryloyl chloride groups) that may be esterified with an appropriate amount of ethylene glycol (EG). Then, a thermoplastic polyurethane (e.g., 4,4'-methylenebis (phenylisocyanate) (MDI)) and a diol (e.g., 1,4-butanediol (BDO)) may be introduced into the system to form an in situ polyurethane (PU) layer. Tensile strength and modulus of the resulting CNM-g-polyurethane composite may be advantageously higher than that of typical neat polyurethane composite with the same processing parameters.

In yet another example, CNM-g-polyurethanes may be produced by grafting polyol-functionalized CNMs (e.g., polyol-functionalized CNTs) to TPU via in-situ polymerization, as described in further detail below.

In some cases, CNMs, such as SWCNT, may be used with soluble cross-linked polyurethane to produce microwave-absorbing composites. Thermoplastic polyurethane (e.g., MDI) may be mixed with hydroxyl terminated polyols (e.g., hydroxyl terminated polybutadiene (HTPB) polyol), followed by the addition of a chain extender (e.g., butane diol (BD) chain extender) enabling crosslinking reaction, and the formation of dispersed CNMs throughout the polyurethane matrix.

In some other cases, CNM-g-polyurethanes may be produced via microwave-assisted solid state grafting, wherein the surface of the CNM (e.g., CNTs) may be modified (e.g., carboxylated CNMs) via microwave radiation. Once well-dispersed, the functionalized CNMs (e.g., carboxylated CNTs) may then be added to a polyurethane solution to produce a polyurethane-CNM mixture, which may then be treated under microwave radiation to afford the CNM-g-polyurethanes.

Alternately, the grafting approach can be used to functionalize CMNs (e.g., MWCNT) with segmented polyurethanes containing hydroxyl groups along its backbone. An esterification reaction may be used between the acidified CMN and the polyurethane segments to covalently attach the polyurethanes to the sidewalls of the CMN.

Further, groups such as carboxyl, lactone, or phenol may be attached to CMNs (e.g., MWCNTs) through either covalent or van der Waals forces, then introduced into the polyurethane matrix during the synthesis of the said polyurethane. The covalently bonded CMN to the polyurethanes may advantageously possess superior mechanical performance over van der Waals attached CMNs.

CNM-g-polyurethane composites may also be synthesized through a prepolymer of polyurethanes functionalized with isocyanate —N=C=O groups which may react with carboxylic acid treated CNMs (e.g., carboxylic acid treated MWCNTs). The functionalized CNMs may be used as crosslinkers in the prepolymer prepared from a reaction of polyurethanes (e.g., 4,4'-methylene bis(phenylisocyanate) (MDI)) and diols (e.g., poly(ε-caprolactone)-diol (PCL)).

Advantageously, highly spherical CNM-g-polyurethane particles/powder can be produced from the polyurethane thermoplastic polymer composites (i.e., CNM-g-polyurethane composites) of the present disclosure via, for example, melt emulsification, cryomilling, and/or precipitation. The said highly spherical CNM-g-polyurethane particles may be sintered for 3D printing applications using a SLS printer.

Consequently and advantageously, parts or objects SLS printed from the highly spherical CNM-g-polyurethane particles of the present disclosure may have improved mechanical properties when compared to polyurethane-based microparticles either having no carbon nanomaterial or having simply compounded polyurethane and carbon nanomaterial.

Definitions and Test Methods

As used herein, the term "catalyst" refers to a compound that, when used at very low concentration in a reaction medium, allows the rate of a reaction (e.g., a polymerization reaction) to be increased via interaction with the reagents, without, however, being chemically altered at the end of the reaction.

As used herein, the term "cocatalyst" refers to a compound capable of acting synergistically with the catalyst to increase the rate of a reaction (e.g., a polymerization reaction).

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "polyurethane monomer(s)" refers to a monomer(s) that form a polyurethane.

As used herein, the term "polyacid" when referring to a compound refers to a compound having two or more carboxylic acid moieties. Herein, anhydride moieties are considered carboxylic acid moieties because the anhydrides open to carboxylic acids during synthesis.

As used herein, the term "polyamine" when referring to a compound refers to a compound having two or more amine moieties.

As used herein, the term "amino acid" when referring to a compound refers to a compound having one or more carboxylic acid moieties and one or more amine moieties. Again, anhydride moieties are considered carboxylic acid moieties because the anhydrides open to carboxylic acids during synthesis.

When referring to a polymer in terms of the -mer units (e.g., polyurethane monomers), it would be understood by one skilled in the art that the -mer units are in the polymerized form in the polymer.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "carbon nanomaterial-graft-polyurethane" and "CNM-g-polyurethane" refer to a carbon nanomaterial as a central or backbone structure having a polyurethane extending therefrom. These terms do not imply the method by which the structure is produced but rather describe the structure itself.

As used herein, the term "carbon nanomaterial" refers to molecules or particles having at least one dimension being 50 nm or less where the core structure of the particle is composed of at least 50 atomic % carbon. Examples of carbon nanomaterials include, but are not limited to, fullerenes, carbon nanotubes, graphites, graphenes, and any combinations thereof.

As used herein, the term "fullerene" refers to particles or molecules having a cage as the core structure and the cage structure having an aspect ratio of 10 or less.

As used herein, the term "carbon nanotube" refers to particles or molecules having an elongated, cylindrical structure as the core structure and the elongated, cylindrical structure having an aspect ratio of more than 10. As used herein, the term "carbon nanotube" encompasses single-walled carbon nanotube (i.e., having one wall), double-walled carbon nanotube (i.e., having two walls), and multi-walled carbon nanotube (i.e., having two or more walls).

As used herein, the term "graphene" refers to particles or molecules having a planar graphitic structure and encompasses single-layer graphene to three-layer graphene.

As used herein, the term "graphite" refers to particles or molecules having more than three layers planar graphite.

The terms "carbon nanomaterial," "fullerene," "carbon nanotubes," "graphite," and "graphene" encompass functionalized versions thereof.

As used herein, the term "embed" relative to particles (e.g., nanoparticles) and a surface of a polymer particle refers to the particle being at least partially extending into the surface of the polymer particle such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50", "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provides an indication of the breadth of the particle size distribution and is calculated as (D90–D10)/D50.

Particle diameters and particle size distributions are determined by light scattering techniques using a Malvern MASTERSIZER™ 3000. For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is CEA/P, where CEA is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Aerated density ($\rho_{aer}$) is measured per ASTM D6393-14.
Bulk density ($\rho_{bulk}$) is measured per ASTM D6393-14.
Tapped density ($\rho_{tap}$) is measured per ASTM D6393-14.
Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil (PDMS)), the kinematic viscosity data cited herein was provided by the manufacturer, whether measured according to the foregoing ASTM or another standard measurement technique.

The crystallization temperature is the temperature at which a polymer crystallizes (i.e., solidification) into a structured form, naturally or in an artificially initiated process, wherein atoms or molecules are highly organized into a crystal. The crystallization temperature may be measured by Differential Scanning calorimetry (DSC). DSC provides a rapid method for determining polymer crystallinity based on the heat required to melt the polymer. The crystallization temperature (° C.) can be determined by ISO 11357 test method or ASTM D3417, for example.

The crystallinity (%) of a polymer, unless otherwise specified, is determined by the ASTM D3417 method, by quantifying the heat associated with melting (fusion) of the polymer.

The melt flow index (MFI) is the measure of resistance to flow of polymer melt under defined set of conditions (unit: g/10 min). Being a measure at low shear rate condition, MFI is inversely related to molecular weight of the polymer.

The dimensional accuracy of SLS part (%) is a quantitative measure of the accuracy of a 3D printed sintered parts of SLS.

As used herein, "tensile modulus" (MPa) of a solid material is a mechanical property that measures its stiffness. It is defined as the ratio of its tensile stress (force per unit area) to its strain (relative deformation) when undergoing elastic deformation. It can be expressed in Pascals or pounds per square inch (psi). ASTM D638-14 can be used to determine tensile modulus of a polymer.

CNM-g-Polyurethane Composites

CNM-g-polyurethanes of the present disclosure may be used for producing spherical microparticles, pellets, or filaments. The spherical microparticles (or powder) comprising CNM-g-polyurethanes of the present disclosure may be used in a three-dimensional (3D) printing technique by selective laser sintering (SLS), whereas the filaments or pellets comprising CNM-g-polyurethanes of the present disclosure may be used in a three-dimensional (3D) printing technique by fused filament fabrication (FFF).

Polyurethanes, herein, may be thermoplastic polyurethanes (TPUs). The polyurethanes may be produced from (a) a polyisocyanate component, (b) a polyol component, and (c) an optional chain extender component.

The polyisocyanate component may comprise an aromatic diisocyanate. The polyisocyanate component may selected from the group consisting of 4,4'-methylenebis (phenyl isocyanate), toluene diisocyanate, 2,4-toluene diisocyanate, 2,6-toluene diisocyanate, or any combination thereof.

The polyol component may be selected from the group consisting of: a polyether polyol, a polyester polyol, a copolymer of polyether and polyester polyols, or any combination thereof. Further, the polyol component may comprise a poly(tetramethylene ether glycol), a polycaprolactone, a polyester adipate, a copolymer thereof, or any combination thereof.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis (phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

The chain extender component may comprise a linear alkylene diol selected from the group consisting of: 1,4-butanediol, 1,12-dodecanediol, dipropylene glycol, or any combination thereof.

Examples of CNM that may have a polyurethane grafted thereto include, but are not limited to, fullerenes, carbon nanotubes (e.g., single walled carbon nanotubes, double walled carbon nanotubes, multiwalled carbon nanotubes, and the like), carbon nanoplatelets, carbon nanosheets, carbon nanohorns, graphite (e.g., graphite particles, highly-oxidized graphite particles, and the like), graphene (e.g., graphene particle, graphene ribbons, graphene sheets, and the like, and highly-oxidized derivatives thereof), and the like, and any combinations thereof.

The CNM-g-polyurethane may comprises about 50 wt % to about 99.95 wt % (or about 55 wt % to about 95 wt %, or about 60 wt % to about 90 wt %, or about 65 wt % to about 85 wt %, or about 70 wt % to about 80 wt %) of the polyurethane, and about 0.05 wt % to about 50 wt % (or about 5 wt % to about 45 wt %, or about 10 wt % to about 40 wt %, or about 15 wt % to about 35 wt %, or about 20 wt % to about 30 wt %, or about 25 wt % to about 50 wt %) of the CNM, based on the total weight of the CNM-g-polyurethane.

In some instances, polyurethanes may be grafted on surfaces of the CNMs by in situ polymerization, or by microwave-assisted solid state grafting, to produce CNM-g-polyurethane, as described in further detail herein. The in situ polymerization may advantageously provide improved properties (e.g., conductivity, tensile strength) of the CNM-g-polyurethane when compare to melt blend processes or solvent blend processes, with the in situ polymerization enabling highly dispersed CNMs (e.g., in situ polymerization with rGOs), thus forming strongly cross-linked networks throughout the TPU matrix.

CNMs may be an amino-functionalized CNMs comprising one or more primary amine (e.g., CMN-$NH_2$) and/or one or more secondary amine (e.g., CMN-NRH wherein R is a $C_1$-$C_{20}$ alkyl group, such as methyl, ethyl, propyl, butyl, pentyl, hexyl, heptyl, octyl, nonyl, decyl, and isomers thereof, a $C_1$-$C_{20}$ cycloalkyl group, $C_1$-$C_{20}$ arylalkyl group), a carboxylic acid functionalized CNMs (e.g., CMN—COOH), amino acid functionalized CNMs (e.g., $NH_2$-CMN-COOH), an acid chloride functionalized CNMs (e.g., CMN-COCl), a hydroxyl functionalized CNMs (e.g., CMN-OH), and the like, and any combination thereof. In some cases, functionalization of CMNs (e.g., CNTs) with carboxylic acid moieties may be carried out in presence of sulfuric acid, nitric acid, chlorate or ammonium persulfate oxidation. Alternately, functionalization of CMNs (e.g., CNTs) may be carried out by direct sulfonation, metalation, electrophilic addition to the deoxygenated surfaces of CNTs.

Grafting of polyurethanes on the surface of the CNMs may be carried out via in situ polymerization, under inert atmosphere (e.g., $N_2$ or Ar). Polyurethanes may be synthesized by a polyaddition reaction of diisocyanates with diols, in presence of an organocatalyst (e.g., an organotin catalyst, an organic tertiary amine combined with organotin catalyst, or N-heterocyclic carbenes (NHCs)). Herein, diisocyanates, polyols, and chain extenders may be used at a molar ratio ranging from about 5:0.1:0.1 to about 1:1:1, such as 1:0.5:0.5, for example (the molar ratio may be modified to obtain different properties); a pre-polymer may be prepared by reacting the diisocyanate (e.g., 4,4'-methylene bis(phenylisocyanate) (MDI)) with the polyol (e.g., polyetherpolyol) at a temperature ranging from about 50° C. to about 120° C. (preferably 80° C.). Solvents, such as organic solvents miscible with the organic reactants used herein (e.g., dimethylformamide (DMF)) may be used herein. Conversion of —OH groups may be monitored/analyzed by titration of NCO groups. A diol (e.g., 1,4-butanediol) and a catalyst (e.g., organotin catalyst such as dibutyltin dilaurate catalyst) may be added to the reaction vessel, enabling the chain extension, The CNM (preferably functionalized CNM) may then be added to the reaction vessel. The resulting slurry mixture may then be poured into a mold to evaporate the solvent. Any residual solvent may be removed by placing the polymer product in a vacuum oven at a temperature ranging from about 25° C. to about 100° C. (preferably 50° C.). Notwithstanding, the CNM may be added prior to the addition of the polyol, prior to the addition of the chain extender, or after the completion of the polymerization.

Herein, CNMs may be graphene oxide prepared from natural graphite via modified Hummers method and further functionalized into a carboxylic acid modified graphite oxide (GO-COOH) or an amino modified graphite oxide (GO-$NH_2$), for example. The carboxylic acid functionalized CNMs (e.g., carboxylic acid modified graphite oxide (GO—COOH)) may be conjugated with diamine monomers and/or dicarboxylic acid monomers via condensation reaction. CNM-g-polyurethane may be formed via condensation reaction between diamine functionalized graphene oxide and dicarboxylic acid monomer. Suitable examples of diamines may include, but not limited to, ethylenediamine, 1,6-diaminohexane, p-phenylenediamine, propylamine, or butylamine. CNMs may be thermally reduced GO (rGO) prepared from natural graphite via modified Hummers method followed by thermal reduction of GO.

The CNM-g-polyurethane may be polyurethane containing GO produced from a covalent reaction between polyurethanes (e.g., TPU) and GOs, or synthesizing polyurethanes in the presence of GOs.

For example, CNM-g-polyurethane wherein CNM is a GO may be formed as follow: diisocyanate, polyol and chain extender may be combine at various molar ratio, such as a molar ratio ranging from about 5:0.1:0.1 to about 1:1:1 (preferably 1:0.5:0.5), for example. Poly(tetrahydrofuran), 4,4'-methylene diphenyl diisocyanate (MDI) may be mixed, and the resulting mixture heated at a temperature ranging from about 50° C. to about 120° C. (preferably 80° C.), thus forming a prepolymer. In a separate reaction vessel, GO may be mixed in an organic solvent that may be miscible with water (e.g., dimethylformamide (DMF)), then sonicated to give a stable dispersion of GO. Then, a diol (e.g., 1,4-butanediol) and a catalyst (e.g., dibutyltinlaurate catalyst) may be added to the reaction vessel at a temperature ranging from about 50° C. to about 120° C. (preferably 80° C.) under continued inert atmosphere (e.g., argon), enabling the chain extension. The reaction may be vigorously stirred for about 30 minutes to 5 hours, and the viscous mixture may then be poured into a Teflon lined mold and/or under vacuum to evaporate any remaining solvent, thus affording the graphene oxide-grafted-polyurethane.

The CNM-g-polyurethane may be produced from an isocyanate-functionalized CNM (e.g., an isocyanate-functionalized GO), wherein the isocyanate-functionalized CMN may be grafted with polyurethanes (e.g., TPU) via in situ polymerization. The said grafting process may be carried out under inert atmosphere (e.g., $N_2$ or Ar). The isocyanate-functionalized CNMs may be prepared as follow: CNM (e.g., GO) may be first dispersed in water via ultrasonication for 5 minutes to 10 hours (or 30 minutes to 5 hours, or 1 hour to 3 hours), followed by centrifugation at 500 rpm to 10,000 rpm (or 1,000 rpm to 5,000 rpm, or 2,000 rpm to 4,000 rpm). The CNM suspension (e.g., GO suspension) may then be subjected to a solvent-exchange process to obtain a dispersion of CNM (e.g., GO) in an organic solvent such as DMF. The solvent-exchange process may be performed by adding the organic solvent (e.g., DMF) to the aqueous CNM (e.g., GO), followed by ultrasonication, centrifugation, and then removal of the supernatant liquid. This process may be repeated several times. The CNM (e.g., GO) may then be suspended again in an organic solvent (e.g., DMF) and reacted with a polyisocyanate (PI), such as an aliphatic polyisocyanate (e.g., DESMODUR® N75), to produce the isocyanate-functionalized CNM (e.g., isocyanate-functionalized GO). The polyisocyanate-functionalized CNM product (e.g., polyisocyanate-functionalized graphene oxide (PI-GO)) may then be coagulated (using an organic solvent such as dichloromethane), filtered, washed, and dried.

Methods for grafting the polyisocyanate-functionalized CNM product (e.g., PI-GO) to polyurethanes (e.g., TPU, or polyurethane prepolymer) via in situ polymerization may comprise: dispersing the polyisocyanate-functionalized CNM product (e.g., PI-GO) in an organic solvent (e.g., DMF) via ultrasonication of the said polyisocyanate-functionalized CNM product to produce a homogenous solution; transferring the homogeneous solution in a separate vessel and adding a diisocyanate (e.g., 4,4'-methylene bis(phenylisocyanate (MDI)) and a polyglycol (e.g., poly(tetrahydrofuran)) at a molar ratio ranging from of 1:0.1 to 1:1 (preferably 1:0.5), with an organic solvent (e.g., dry DMF). The reaction mixture may be heated at a temperature ranging from about 50° C. to about 120° C. (preferably 80° C.) for 30 minutes or more (or 1 hour or more, or 2 hours or more, or 3 hours or more, or 4 hours or more, or 5 hours or more). A diol (e.g., 1,4-butanediol) and a catalyst suitable to polymerize the polyurethanes (e.g., dibutyltinlaurate catalyst) may be added to the reaction vessel. Upon completion, the reaction vessel may be degassed via vacuum, and the resulting slurry (viscous polymer solution) may be poured into an aluminum pan to evaporate the solvent.

The CNM-g-polyurethane may be polyurethane containing CNTs (e.g., single walled carbon nanotubes (SWCNT), multi-walled (MWCNT), or double-walled (DWCNT)) produced from a covalent reaction between polyurethanes (e.g., TPU) and CNTs, or synthesizing polyurethanes in the presence of CNTs. Other nonlimiting examples of suitable methods to evaporate the solvent may include precipitation of polymer, spray drying, thin film evaporation, rotary evaporation.

The CNM-g-polyurethane may be produced from a functionalized CNM (e.g., COOH-functionalized CNT), wherein the functionalized CMN may be grafted with polyurethanes (e.g., TPU) via microwave-assisted solid state grafting. Methods for grafting the COOH-functionalized CNM product (e.g., COOH-CNT) to polyurethanes via microwave-assisted solid state may comprise: (a) prior to synthesizing the CNM-g-polyurethane polymer composite, forming the carboxyled CNTs by acid-treating the CNTs in a mixture of concentrated acid (e.g., concentrated acid mixture of sulfuric acid and nitric acid, at a ratio of 3:1 to 1:1) via microwave radiation at a temperature ranging from about 100° C. to about 200° C. (preferably from about 120° C. to about 150° C., such as 140° C. for example) for 1 minute or more (or 5 minutes or more, or 10 minutes or more, or 15 minutes or more, or 20 minutes or more, or 25 minutes or more, or 30 minutes or more). After the acid treatment, the CNTs may be transferred into a separate vessel, followed by the addition of deionized (DI) water, and the mixture cooled down to room temperature. The oxidized product may be filtered using a Teflon membrane and resulting carboxylated CNT products may be washed with DI water until a neutral pH is reached, and then dried in a vacuum oven; (b) grafting of carboxylated CNTs via microwave radiation (at 0.5 wt % CNTs or greater, at 1 wt % CNTs or greater, at 5 wt % CNTs or greater, at 10 wt % CNTs or greater) by dispersing the carboxylated CNTs in an organic solvent (e.g., THF) via ultrasonication. In a separate container, polyurethanes may be dissolved the same organic solvent (e.g., THF), and the well-dispersed carboxylated CNTs may be added dropwise to the polyurethane solution with stirring until a homogenous mixture can be obtained. The mixture may then be poured into a mold and the solvent evaporated. The mixture of polyurethanes and carboxylated CNTs can then be treated under microwave radiation for 1 minute or more (or 5 minutes or more, or 10 minutes or more, or 15 minutes or more, or 20 minutes or more, or 25 minutes or more, or 30 minutes or more), with a total power output of about 10% or greater (or 20% or greater, or 30% or greater, or 40% or greater, or 50% or greater) of 500 W to 1,000 W, preferably 50% of 800 W.

In some cases, methods for producing CNM-g-polyurethane may comprise: (a) oxidizing CNM (e.g., CNTs) to produce carboxyl-functionalized CNMs (e.g., COOH-CNTs); (b) acid chloride functionalization of the carboxyl-functionalized CNMs surface (e.g., COOH-CNTs surface) in presence of thionyl chloride ($SOCl_2$) with ultrasonication to produce acyl chloride functionalized CMNs (e.g., ClCO-CNTs); (c) grafting the acid chloride functionalization of the CMNs to polyol (e.g., poly(ε-caprolactone) (PCL)-diol) to produce polyol functionalized CMNs; and (d) grafting the polyol functionalized CMNs to polyurethanes via in situ polymerization to produce CNM-g-polyurethanes (the material may also be used to endcap the polymer if added after the completion of the polymerization, and the isocyanate groups are present in excess).

In some other cases, methods for producing CNM-g-polyurethane may comprise an in situ polymerization with amine-functionalized CNMs (e.g., amine-modified carbon sources such as $H_2N$-CNTs). Preparation of amino-functionalized CNMs (e.g., amino-functionalized CNTs such as $H_2N$-MWCNT) may comprise: oxidizing CNMs via acid-treating the CNMs with a mixture of concentrated acid (e.g., concentrated acid mixture of sulfuric acid and nitric acid, at a ratio of 3:1 to 1:1). The acidification may take place with sonication of the CNMs in the acid solution at a temperature ranging from about 30° C. to about 100° C. (preferably 50° C.). The CNMs/acid mixture may then be poured into deionized water, filtered, and washed repeatedly until the pH value of the filtration solution would be around 7 (neutral pH). The acidified CNM product may then be dried in a vacuum oven. The resulting CNMs-COOH may be dispersed in an organic solvent (e.g., THF) under sonication for at least 1 hour. To this dispersion, while stirring at ambient temperature, may be added ethylenediamine (EDA), 4-(dimethylamino)pyridine (DMAP), N,N'-dicyclohexylcarbodiimide (DCC). The dispersion/solution may be heated at a temperature ranging from about 30° C. to about 100° C. (preferably 60° C.) maintained for 12 hours to 24 hours with stirring. The product may be a black solid that may be collected easily and washed with an organic solvent (e.g., THF). The product may be dried in a vacuum oven to obtain the amine-functionalized CNMs. Then, grafting the amine-functionalized CNMs to TPU via in situ polymerization may comprise: dispersing the amine-functionalized CNMs in dry DMF via ultrasonication to produce a homogenous solution; transferring the homogeneous solution to a separate vessel and disperse the amine-functionalized CNMs in dry DMF via ultrasonication. MDI and poly(tetrahydrofuran) may be added, and the reaction may be carried out at a temperature ranging from about 30° C. to about 100° C. (preferably 80° C.) for 1 hour or more (or 2 hours or more, or 3 hours or more, or 5 hours or more, or 10 hours or more). Then a diol (e.g., 1,4-butane diol) and a catalyst suitable for polymerization of TPU (e.g., dibutyltinlaurate catalyst) may be added. The solvent of the resulting slurry may then be evaporated.

The CNM-g-polyurethane may be polyurethane containing fullerene produced from a covalent reaction between functional polymers and fullerenes, or synthesizing polymers in the presence of fullerenes, wherein polymeric fullerenes may be prepared by: side-chain polymers, main-chain polymers, dendritic fullerenes, star-shaped polymers, fullerene end-capped polymers, and the like. Herein, functionalized CNMs may be amino-functionalized $C_{60}$-based fullerenes, carboxyamide-functionalized $C_{60}$-based fullerenes, for example. Fullerene-g-polyurethane may be formed under mild conditions at room temperature, by reacting amino-functionalized $C_{60}$-based fullerenes with acid chloride functionalized polyurethanes, to form an amide bond between the $C_{60}$-primary and/or secondary amine.

In another nonlimiting example, the CNM-g-polyurethane may be polyurethane containing fullerene produced from polymer-bound $C_{60}$ using soluble amino polymers (e.g., $NH_2$ group from polyurethane end groups or a monomer comprising branched amino group) capable of adding to fullerene double bonds. CNM-g-polyurethane (e.g., $C_{60}$-g-polyurethane) may be obtained by allowing the amino polymers to react with $C_{60}$ under mild conditions at room temperature.

In another nonlimiting example, the CNM-g-polyurethane may be polyurethane containing hydroxyl-functionalized fullerene produced from (a) surface modification of fullerene $C_{60}$ via acid-mediated oxidation of the fullerene (e.g., treating the pristine fullerene with concentrated $HNO_3$) to produce the hydroxyl-functionalized fullerene, which may be washed with distilled water until a neutral pH is reached, and dried under vacuum to remove any residual solvent, thus affording a hydroxyl-functionalized fullerene powder which may then be used in the polymerization reaction; (b) grafting the hydroxyl-functionalized fullerene to TPU via in situ polymerization. Depending on when the hydroxyl-functionalized fullerene may be added to the polymerization, the material may be used to graft to the polymer backbone or to endcap the polymer chains.

CNM-g-Polyurethane and Methods of Making

The methods and compositions described herein relate to highly spherical polymer particles that comprise CNM-g-polyurethane. As described above, the present disclosure relates to polyurethanes (e.g., TPU), thermoplastic elastomers (TPE) and other thermoplastic rubbers that combine crystalline (hard segments) and amorphous (soft segments) polymers which may be covalently bonded, grafted, or linked to carbon nanofillers (e.g., CNTs), graphene oxides (GO), carbon nanofibers, fullerenes, etc. Herein, compositions may include a carbon nanofiller (e.g., CNT), a hard segment (e.g., diisocyanate and diol, or diamine), and a soft segment (polyester or polyether macrodiol) which may undergo composite melt emulsification into highly spherical microparticles. Without being limited by theory, it is believed that having the polyurethane grafted to the CNM aids in a more homogeneous distribution of the CNM in the polymer particles, which results in a more homogeneous distribution in objects (or portions thereof) produced by additive manufacturing methods using said polymer particles.

The present disclosure also relates to methods that comprise: mixing a mixture comprising: (a) a CNM-g-polyurethane, wherein the CNM-g-polyurethane particles comprises a polyurethane grafted to a carbon nanomaterial, (b) a carrier fluid that is immiscible with the polyurethane of the CNM-g-polyurethane, optionally (c) a thermoplastic polymer (which may be the same or different than the polyurethane of the CNM-g-polyurethane) not grafted to a CNM, and optionally (d) an emulsion stabilizer at a temperature greater than a melting point or softening temperature of the polyurethane and at a shear rate sufficiently high to disperse the CNM-g-polyurethane in the carrier fluid; cooling the mixture to below the melting point or softening temperature of the polyurethane to form spherical polymer particles; and separating the spherical polymer particles from the carrier fluid.

FIG. 1 is a flow chart of a nonlimiting example method 100 of the present disclosure. CNM-g-polyurethane 102, carrier fluid 104, optionally emulsion stabilizer 106, and optionally thermoplastic polymer not grafted to a CNM 108 (e.g., the polyurethane of the CNM-g-polyurethane 102, a polyurethane not of the CNM-g-polyurethane 102, another thermoplastic polymer, or any combination thereof) are combined 110 to produce a mixture 112. It is noted that referenced numeral 108 refers to the "thermoplastic polymer not grafted to a CNM."

The components 102, 104, 106, and 108 can be added individually or in a blend of components in any order and include mixing and/or heating during the process of combining 110 the components 102, 104, 106, and 108. For example, the CNM-g-polyurethane 102 and the thermoplastic polymer not grafted to a CNM 108, if included, may be premixed before combining 110. Herein, the polyurethane of the CNM-g-polyurethane refers to the polyurethane if not grafted to a CNM.

The mixture 112 is then processed 114 by applying sufficiently high shear to the mixture 112 at a temperature greater than the melting point or softening temperature of (a) the polyurethane of the CNM-g-polyurethane 102 or (b) thermoplastic polymer not grafted to a CNM 108, whichever is greater to form a melt emulsion 116. Because the temperature is above the melting point or softening temperature of polymeric portions of the mixture 112 (i.e., the polyurethane of the CNM-g-polyurethane 102 and, if included, thermoplastic polymer not grafted to a CNM 108), a polymer melt forms that comprises the CNM-g-polyurethane 102 and, if included, thermoplastic polymer not grafted to a CNM 108. The shear rate should be sufficient enough to disperse the polymer melt (e.g., comprising CNM-g-polyurethane) in the carrier fluid 104 as droplets (i.e., the polymer emulsion 116). Without being limited by theory, it is believed that, all other factors being the same, increasing shear should decrease the size of the droplets of the polymer melt in the carrier fluid 104. However, at some point there may be diminishing returns on increasing shear and decreasing droplet size or there may be disruptions to the droplet contents that decrease the quality of particles produced therefrom.

The melt emulsion 116 inside and/or outside the mixing vessel is then cooled 118 to solidify the polymer droplets into CNM-g-polyurethane particles 124. The term "CNM-g-polyurethane particles" refers to polymer particles comprising the CNM-g-polyurethane 102 and may include other components in the polymer particles (e.g., the thermoplastic polymer not grafted to a CNM 108).

The cooled mixture 120 can then be treated 122 to isolate the CNM-g-polyurethane particles 124 from other components 126 (e.g., the carrier fluid 104, excess emulsion stabilizer 106, and the like) and wash or otherwise purify the CNM-g-polyurethane particles 124. The CNM-g-polyurethane particles 124 comprise the CNM-g-polyurethane 102 and the thermoplastic polymer not grafted to a CNM 108, when included, and at least a portion of the emulsion stabilizer 106, when included, coating the outer surface of the CNM-g-polyurethane particles 124. Emulsion stabilizers 106, or a portion thereof, may be deposited as coating, perhaps a uniform coating, on the CNM-g-polyurethane particles 124. In some instances, which may be dependent upon nonlimiting factors such as the temperature (including cooling rate), the type of CNM-g-polyurethane 102, and the types and sizes of emulsion stabilizers 106, the nanoparticles of emulsion stabilizers 106 may become at least partially embedded within the outer surface of CNM-g-polyurethane particles 124. Even without embedment taking place, at least a portion of the nanoparticles within emulsion stabilizers 106 may remain robustly associated with CNM-g-polyurethane particles 124 to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particulates.

The CNM-g-polyurethane particles 124 may optionally be further purified 128 (described in more detail below) to yield purified CNM-g-polyurethane particles 130.

The carrier fluid 104 should be chosen such that at the various processing temperatures (e.g., from room temperature to process temperature) the CNM-g-polyurethane 102 and the carrier fluid 104 are immiscible. An additional factor that may be considered is the differences in (e.g., a difference or a ratio of) viscosity at process temperature between the CNM-g-polyurethane 102 and the carrier fluid 104. The differences in viscosity may affect droplet breakup and particle size distribution. Without being limited by theory, it is believed that when the viscosities of the CNM-g-polyurethane 102 and the carrier fluid 104 are too similar, the circularity of the product as a whole may be reduced where the particles are more ovular and more elongated structures are observed.

The CNM-g-polyurethane 102 may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polyurethane 102, the thermoplastic polymers not grafted to a CNM 108, and the carrier fluid 104 combined. When the thermoplastic polymers not grafted to a CNM 108 is included, CNM-g-polyurethane 102 and the thermoplastic polymers not grafted to a CNM 108 combined may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polyurethane 102, the thermoplastic polymers not grafted to a CNM 108, and the carrier fluid 104 combined. When include, the weight ratio of the CNM-g-polyurethane 102 to the thermoplastic polymers not grafted to a CNM 108 may be about 10:90 to about 99:1 (or about 10:90 to about 50:50, or about 25:75 to about 75:25, or about 50:50 to about 99:1, or about 80:20 to about 99:1).

Examples of thermoplastic polymers not grafted to a CNM 108 may include, but are not limited to, polyamides, polyurethanes, polyethylenes (preferably functionalized polyethylenes), polypropylenes (preferably functionalized polypropylenes), polyacetals, polycarbonates, polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene-propylene elastomer (EPR), poly(4-methyl-1-pentene), polyhexamethylene terephthalate, polystyrenes, polyvinyl chlorides, polytetrafluoroethenes, polyesters (e.g., polylactic acid), polyethers, polyether sulfones (PESU), polysulfones (PSU), polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyamides, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate), polybutadienes, polyisoprenes, styrenic block copolymers, polyacrylonitriles, silicones, and the like, and any combination thereof. Copolymers comprising one or more of the foregoing may also be used in the methods and systems of the present disclosure.

Non-polar polymer blends (e.g., polymer blends of TPU and various thermoplastic polymers, such as polyacetal, polyamide 6, poly(vinyl chloride), poly(vinyl butyral), polycarbonate, polypropylene, and polyethylene) may be achievable by using a compatibilizing agent. TPU itself may be tuned via soft and hard segments in order to increase its compatibility or miscibility with other polymers (e.g., poly (styrene-b-4-vinylpyridine) diblock copolymer as a compatibilizer).

Examples polyamides may include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash.

The thermoplastic polymers not grafted to a CNM 108 in the compositions and methods of the present disclosure may be elastomeric or non-elastomeric. Some of the foregoing examples of thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Polyurethanes may comprise aliphatic, aromatic, ether, ester, urethane, and urea groups, thus providing a wide range of polarities and hydrogen-bonding possibilities, which may promote miscibility, or at least strong interfacial bonding, with a wide variety of other polymers.

Compatibilizers may optionally be used to improve the blending efficiency and efficacy of the CNM-g-polyurethane 102 with one or more thermoplastic polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyurethanes, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The polyurethane of the CNM-g-polyurethane 102 and/or the thermoplastic polymer not grafted to a CNM 108 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The polyurethane of the CNM-g-polyurethane 102 and/or the thermoplastic polymer not grafted to a CNM 108 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymer not grafted to a CNM 108 may optionally comprise an additive. Typically, the additive would be present before addition of the thermoplastic polymers to the mixture. Therefore, in the polymer melt droplets and resultant CNM-g-polyurethane particles 124/130, the additive is dispersed throughout the thermoplastic polymer. Accordingly, for clarity, this additive is referred to herein as an "internal additive." The internal additive may be blended with the thermoplastic polymer just prior to making the mixture or well in advance.

When describing component amounts in the compositions described herein (e.g., the mixture 112 and the CNM-g-polyurethane particles 124), a weight percent based on the thermoplastic polymer not inclusive of the internal additive. For example, a composition comprising 1 wt % of emulsion stabilizer 106 by weight of 100 g of a thermoplastic polymer comprising 10 wt % internal additive and 90 wt % thermoplastic polymer is a composition comprising 0.9 g of emulsion stabilizer 106, 90 g of thermoplastic polymer, and 10 g of internal additive.

The present disclosure provides compositions comprising: CNM-g-polyurethane particles comprising a polyurethane grafted to a carbon nanomaterial. The CNM-g-polyurethane particles may have an average particle size of about 10 μm to about 100 μm and a diameter span of about 1 to about 2. The CNM-g-polyurethane particles may include the CNM at about 0.05 wt % to about 50 wt % of the CNM-g-polyurethane particles, and the CNM may be selected from the group consisting of a carbon nanotube, a graphite, a graphene, a fullerene, and any combinations thereof.

The internal additive may be present in the thermoplastic polymer at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer not grafted to a CNM 108. For example, the thermoplastic polymer may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof. For example, fillers used herein may include exfoliated graphite (EG), exfoliated graphite nanoplatelets (xGnP), carbon black, carbon nanofibers (CNF), carbon nanotubes (CNT), graphenes, graphene oxides, graphite oxides, graphene oxide nanosheets, fullerenes.

Suitable carrier fluids (e.g., carrier fluid 104) may have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt). For example, suitable carrier fluids (e.g., carrier fluid 104) may have a viscosity at 25° C. of about 10,000 cSt to about 60,000 cSt.

Examples of carrier fluids (e.g., carrier fluid 104) may include, but are not limited to, silicone oil, fluorinated silicone oils, perfluorinated silicone oils, polyethylene glycols, alkyl-terminal polyethylene glycols (e.g., $C_1$ to $C_4$ terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 104 comprises two or more of the foregoing, the carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid 104 comprising a silicone oil and an alkyl-terminal polyethylene glycol may form a two-phase carrier fluid. In at least one embodiment, the carrier fluid 104 is polydimethylsiloxane (PDMS).

The carrier fluid 104 may be present in the mixture at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the CNM-g-polyurethane 102, the thermoplastic polymers not grafted to a CNM 108, and the carrier fluid 104 combined. The carrier fluid may be present at a weight ratio of the carrier fluid to a combination of the CNM-g-polyurethane 102 and the thermoplastic polymer ranging from 50:50 to 90:10.

In some instances, the carrier fluid 104 may have a density of about 0.6 g/cm$^3$ to about 1.5 g/cm$^3$, and the thermoplastic polymer may have a density of about 0.7 g/cm$^3$ to about 1.7 g/cm$^3$, wherein the thermoplastic polymer may have a density similar, lower, or higher than the density of the carrier fluid 104.

The CNM should be sufficiently stable to not decompose at the processing temperatures. Examples of CNM may include, but are not limited to, carbon nanotubes, graphites, graphenes, fullerenes, carbon black; and the like; and any combination thereof.

The emulsion stabilizers (e.g., emulsion stabilizer 106) used in the methods and compositions of the present disclosure may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2/g$), AEROSIL® RX50 (about 40 nm average diameter silica nanoparticles having a hydrophobically modified surface and a BET surface area of 35±10 $m^2/g$), AEROSIL® 380 (silica nanoparticles having a hydrophilically modified surface and a BET surface area of 380±30 $m^2/g$), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer (e.g., emulsion stabilizer 106) in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the CNM-g-polyurethane 102. Alternatively, the mixture may comprise no (or be absent of) surfactant.

A weight ratio of nanoparticles to surfactant in the emulsion stabilizer 106 may be about 1:10 to about 10:1 (or about 1:10 to about 1:1, or about 1:5 to about 5:1, or about 1:1 to about 10:1).

The emulsion stabilizer 106 may be included in the mixture at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the CNM-g-polyurethane 102 and the thermoplastic polymers not grafted to a CNM 108 combined.

Relative to the combining 110 of FIG. 1, in some instances, the emulsion stabilizer 106 may first be dispersed in the carrier fluid 104, optionally with heating said dispersion, before adding the CNM-g-polyurethane 102 and/or the thermoplastic polymers not grafted to a CNM 108. In another nonlimiting example, the CNM-g-polyurethane 102 and/or the thermoplastic polymers not grafted to a CNM 108 may be heated to produce a polymer melt to which the carrier fluid 104 and emulsion stabilizer 106 are added together or in either order. In yet another nonlimiting example, the CNM-g-polyurethane 102 and/or the thermoplastic polymers not grafted to a CNM 108 along with carrier fluid 104 can be mixed at a temperature greater than the necessary melting point or softening temperature described herein and at a shear rate sufficient enough to disperse the polymer melt in the carrier fluid 104. Then, the emulsion stabilizer 106 can be added to form the mixture 112 and maintained at suitable process conditions for a set period of time.

Combining the CNM-g-polyurethane 102, the thermoplastic polymers not grafted to a CNM 108, the carrier fluid 104, and optionally the emulsion stabilizer 106 in any combination can occur in a mixing apparatus used for the processing and/or another suitable vessel. By way of non-limiting example, the CNM-g-polyurethane 102 and/or the thermoplastic polymers not grafted to a CNM 108 may be heated to a temperature greater than the necessary melting point or softening temperature described herein in the mixing apparatus used for the processing, and the emulsion stabilizer 106 may be dispersed in the carrier fluid 104 in another vessel. Then, said dispersion may be added to the melt in the mixing apparatus used for the processing.

The mixing apparatuses used for the processing 114 to produce the melt emulsion 116 should be capable of maintaining the melt emulsion 116 at a temperature greater than the necessary melting point or softening temperature described herein and applying a shear rate sufficient to disperse the polymer melt in the carrier fluid 104 as droplets.

Examples of mixing apparatuses used for the processing 114 to produce the melt emulsion 116 may include, but are not limited to, extruders (e.g., continuous extruders, batch extruders, and the like), stirred reactors, blenders, reactors with inline homogenizer systems, and the like, and apparatuses derived therefrom.

The processing 114 and forming the melt emulsion 116 at suitable process conditions (e.g., temperature, shear rate, and the like) for a set period of time.

The temperature of the processing 114 and forming the melt emulsion 116 should be a temperature greater than the necessary melting point or softening temperature of the described herein and less than the decomposition temperature of any components (i.e., the CNM-g-polyurethane 102, the thermoplastic polymers not grafted to a CNM 108, carrier fluid 104, emulsion stabilizer 106) in the mixture 112. For example, the temperature of processing 114 and forming the melt emulsion 116 may be about 1° C. to about 50° C. (or about 1° C. to about 25° C., or about 5° C. to about 30° C., or about 20° C. to about 50° C.) greater than the melting point or softening temperature described herein provided the temperature of processing and forming the melt emulsion 116 is less than the decomposition temperature of any components (i.e., the CNM-g-polyurethane 102, the thermoplastic polymers not grafted to a CNM 108, carrier fluid 104, emulsion stabilizer 106) in the mixture 112.

The shear rate of processing 114 and forming the melt emulsion 116 should be sufficiently high to disperse the polymer melt in the carrier fluid 104 as droplets. Said droplets should comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The time for maintaining said temperature and shear rate for processing 114 and forming the melt emulsion 116 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing can be stopped. That time may depend on, among other things, the temperature, shear rate, the CNM-g-polyurethane 102, the thermoplastic polymers not grafted to a CNM 108, the carrier fluid composition 104, and the emulsion stabilizer composition 106.

The melt emulsion 116 may then be cooled 118. Cooling 118 can be slow (e.g., allowing the melt emulsion 116 to cool 118 under ambient conditions) to fast (e.g., quenching). For example, the rate of cooling 118 may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 116. In some instances, the shear applied during heating may be applied during cooling 118.

The cooled mixture resulting from cooling 118 the melt emulsion 116 may comprise solidified CNM-g-polyurethane particles 124 and other components (e.g., the carrier fluid 104, excess emulsion stabilizer 106, and the like). The CNM-g-polyurethane particles 124 may be dispersed in the carrier fluid 104 and/or settled in the carrier fluid 104.

The cooled mixture may then be treated to the separate CNM-g-polyurethane particles 124 from the other components. Suitable treatments include, but are not limited to, washing, filtering, centrifuging, decanting, and the like, and any combination thereof.

Solvents used for washing the CNM-g-polyurethane particles 124 should generally be (a) miscible with the carrier fluid 104 and (b) nonreactive (e.g., non-swelling and non-dissolving) with the CNM-g-polyurethane 102 and/or thermoplastic polymers not grafted to a CNM 108. The choice of solvent will depend on, among other things, the compositions of the carrier fluid 104, the CNM-g-polyurethane 102, and the thermoplastic polymers not grafted to a CNM 108.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the CNM-g-polyurethane particles 124 by drying using an appropriate method such as air-drying, heat-drying, reduced pressure drying, freeze drying, or a hybrid thereof. The heating may be performed preferably at a temperature lower than the glass transition point of the polyurethane of CNM-g-polyurethane 102 and the thermoplastic polymers not grafted to a CNM 108, when included, (e.g., about 50° C. to about 150° C.).

Advantageously, carrier fluids (e.g., carrier fluid 104) and washing solvents of the systems and methods described herein can be recycled and reused. One skilled in the art will recognize any necessary cleaning of used carrier fluid 104 and solvent necessary in the recycling process.

The CNM-g-polyurethane particles 124, after separation from the other components, may optionally be further purified. For example, to narrow the particle size distribution (or reduce the diameter span), the CNM-g-polyurethane particles 124 can be passed through a sieve having a pore size of about 10 µm to about 250 µm (or about 10 µm to about 100 µm, or about 50 µm to about 200 µm, or about 150 µm to about 250 µm).

In another example purification technique, the CNM-g-polyurethane particles 124 may be washed with water to remove surfactant while maintaining substantially all of the nanoparticles associated with the surface of the CNM-g-polyurethane particles 124. In yet another example purification technique, the CNM-g-polyurethane particles 124 may be blended with additives to achieve a desired final product. For clarity, because such additives are blended with the CNM-g-polyurethane particles 124 described herein after the particles are solidified, such additives are referred to herein as "external additives." Examples of external additives include flow aids, other polymer particles, fillers, and the like, and any combination thereof.

In some instances, a surfactant used in making the CNM-g-polyurethane particles 124 may be unwanted in downstream applications. Accordingly, yet another example purification technique may include at least substantial removal of the surfactant from the CNM-g-polyurethane particles 124 (e.g., by washing and/or pyrolysis).

The CNM-g-polyurethane particles 124 and/or purified CNM-g-polyurethane particles 124 may be characterized by composition, physical structure, and the like.

As described above, the emulsion stabilizers (e.g., emulsion stabilizer 106) are at the interface between the polymer melt and the carrier fluid 104. As a result, when the mixture is cooled, the emulsion stabilizers (e.g., emulsion stabilizer 106) remain at, or in the vicinity of, said interface. Therefore, the structure of the CNM-g-polyurethane particles 124 is, in general when emulsion stabilizers (e.g., emulsion stabilizer 106) are used, includes emulsion stabilizers (a) dispersed on an outer surface of the CNM-g-polyurethane particles 124 and/or (b) embedded in an outer portion (e.g., outer 1 vol %) of the CNM-g-polyurethane particles 124.

Further, where voids form inside the polymer melt droplets, emulsion stabilizers (e.g., emulsion stabilizer 106) should generally be at (and/or embedded in) the interface between the interior of the void and the CNM-g-polyurethane 124 and/or thermoplastic polymer. The voids generally do not contain the CNM-g-polyurethane 124 and/or thermoplastic polymer. Rather, the voids may contain, for example, carrier fluid 104, air, or be void. The CNM-g-polyurethane particles 124 may comprise carrier fluid 104 at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the CNM-g-polyurethane particles 124.

When the thermoplastic polymers not grafted to a CNM is not included, the CNM-g-polyurethane and the thermoplastic polymers not grafted to a CNM, combined, may be present in the CNM-g-polyurethane particles at about 90 wt % to about 99.5 wt % (or about 90 wt % to about 95 wt %, or about 92 wt % to about 97 wt %, or about 95 wt % to about 99.5 wt %) of the CNM-g-polyurethane particles. When the thermoplastic polymers not grafted to a CNM is included, the CNM-g-polyurethane and the thermoplastic polymers not grafted to a CNM, combined, may be present in the CNM-g-polyurethane particles at about 90 wt % to about 99.5 wt % (or about 90 wt % to about 95 wt %, or about 92 wt % to about 97 wt %, or about 95 wt % to about 99.5 wt %) of the CNM-g-polyurethane particles. The weight ratio of the CNM-g-polyurethane to the thermoplastic polymers not grafted to a CNM, when included, may be about 10:90 to about 99:1 (or about 10:90 to about 50:50, or about 25:75 to about 75:25, or about 50:50 to about 99:1, or about 80:20 to about 99:1).

When included, the emulsion stabilizers (e.g., emulsion stabilizer 106) may be present in the CNM-g-polyurethane particles 124 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the CNM-g-polyurethane particles 124. When purified to at least substantially remove surfactant or another emulsion stabilizer, the emulsion stabilizers may be present in the CNM-g-polyurethane particle 124/130 at less than 0.01 wt % (or 0 wt % to about 0.01 wt %, or 0 wt % to 0.001 wt %).

Upon forming thermoplastic particulates according to the disclosure herein using particulate emulsion stabilizers, at least a portion of the particulate emulsion stabilizers, such as silica nanoparticles, may be disposed as a coating upon the outer surface of the CNM-g-polyurethane particle 124/130. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polyurethane particles. When purified to at least substantially remove surfactant or another emulsion stabilizer, the emulsion stabilizers may be present in the CNM-g-polyurethane particles 124/130 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the CNM-g-polyurethane particles 124/130. The coverage of the emulsion stabilizers on an outer surface of the CNM-g-polyurethane particles 124/130 may be determined using image analysis of the scanning electron microscope images (SEM micrographs). The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polyurethane particles 124/130 (and coated CNM-g-polyurethane particles, when produced). When purified to at least substantially remove surfactant or another emulsion stabilizer, the emulsion stabilizers may be present in the CNM-g-polyurethane particles 124/130 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the CNM-g-polyurethane particles 124/130. The coverage of the emulsion stabilizers on an outer surface of the CNM-g-polyurethane particles may be determined using image analysis of the SEM micrographs.

The CNM-g-polyurethane particles 124/130 of the present disclosure may include the carbon nanomaterial (or cumulative carbon nanomaterials if more than one is used) at about 0.01 wt % to about 50 wt % (or about 0.01 wt % to about 1 wt %, or about 0.1 wt % to about 5 wt %, or about 1 wt % to about 10 wt %, or about 5 wt % to about 20 wt %, or about 10 wt % to about 30 wt %, or about 25 wt % to about 50 wt %) of the CNM-g-polyurethane particles 124/130.

The CNM-g-polyurethane particles 124/130 may comprise one or more carbon nanomaterial. For example, two or more different carbon nanomaterials may be grafted to a polyurethane in the same reaction and then used as CNM-g-polyurethane 102 in the methods and compositions described herein. In another example, two different CNM-g-polyurethanes may be produced and blended before (or during) the mixing process of the melt-emulsification process described herein.

The CNM-g-polyurethane particles 124/130 may have a circularity of about 0.90 to about 1.0.

The CNM-g-polyurethane particles 124/130 may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

The CNM-g-polyurethane particles 124/130 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D900. The CNM-g-polyurethane particles 124/130 may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferable, the CNM-g-polyurethane particles 124/130 have a diameter span of about 0.2 to about 1.

In a first nonlimiting example, the CNM-g-polyurethane particles 124/130 may have a D10 of about 0.1 μm to about 10 μm, a D50 of about 0.5 μm to about 25 μm, and a D90 of about 3 μm to about 50 μm, wherein D10<D50<D90. Said CNM-g-polyurethane particles 124/130 may have a diameter span of about 0.2 to about 2.

In a second nonlimiting example, the CNM-g-polyurethane particles 124/130 may have a D10 of about 5 μm to about 30 μm, a D50 of about 30 μm to about 70 μm, and a D90 of about 70 μm to about 120 μm, wherein D10<D50<D90. Said CNM-g-polyurethane particles 124/130 may have a diameter span of about 1.0 to about 2.5.

In a third nonlimiting example, the CNM-g-polyurethane particles 124/130 may have a D10 of about 25 μm to about 60 μm, a D50 of about 60 μm to about 110 μm, and a D90 of about 110 μm to about 175 μm, wherein D10<D50<D90. Said CNM-g-polyurethane particles 124/130 may have a diameter span of about 0.6 to about 1.5.

In a fourth nonlimiting example, the CNM-g-polyurethane particles 124/130 may have a D10 of about 75 μm to about 125 μm, a D50 of about 100 μm to about 200 μm, and a D90 of about 125 μm to about 300 μm, wherein D10<D50<D90. Said CNM-g-polyurethane particles 124/130 may have a diameter span of about 0.2 to about 1.2.

In a fifth nonlimiting example, the CNM-g-polyurethane particles 124/130 may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 μm), and a D90 of about 60 μm to about 300 μm (or about 70 μm to about 200 μm, or about 60 μm to about 150 μm, or about 150 μm to about 300 μm), wherein D10<D50<D90. The CNM-g-polyurethane particles 124/130 may also have a diameter span of about 0.4 to about 3 (or about 0.6 to about 2, or about 0.4 to about 1.5, or about 1 to about 3).

The CNM-g-polyurethane particles 124/130 may have a circularity of about 0.9 or greater (or about 0.90 to about 1.0, or about 0.93 to about 0.99, or about 0.95 to about 0.99, or about 0.97 to about 0.99, or about 0.98 to 1.0).

The CNM-g-polyurethane particles 124/130 may have an angle of repose of about 25° to about 45° (or about 25° to about 35°, or about 30° to about 40°, or about 35° to about 45°).

The CNM-g-polyurethane particles 124/130 may have a Hausner ratio of about 1.0 to about 1.5 (or about 1.0 to about 1.2, or about 1.1 to about 1.3, or about 1.2 to about 1.35, or about 1.3 to about 1.5).

The CNM-g-polyurethane particles 124/130 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

The CNM-g-polyurethane particles 124/130 may have an aerated density of about 0.5 g/cm$^3$ to about 0.8 g/cm$^3$ (or about 0.5 g/cm$^3$ to about 0.7 g/cm$^3$, or about 0.55 g/cm$^3$ to about 0.80 g/cm$^3$).

The CNM-g-polyurethane particles 124/130 may have a tapped density of about 0.6 g/cm$^3$ to about 0.9 g/cm$^3$ (or about 0.60 g/cm$^3$ to about 0.75 g/cm$^3$, or about 0.65 g/cm$^3$ to about 0.80 g/cm$^3$, or about 0.70 g/cm$^3$ to about 0.90 g/cm$^3$).

Depending on the temperature and shear rate of processing and the composition and relative concentrations of the components (e.g., the CNM-g-polyurethane 102, the thermoplastic polymer, the carrier fluid 104, excess emulsion stabilizer 106, and the like) different shapes of the structures that compose the CNM-g-polyurethane particles 124/130 may be produced. Typically, the CNM-g-polyurethane particles 124/130 comprise substantially spherical particles (having a circularity of about 0.97 or greater). However, other structures including disc and elongated structures may be observed in the CNM-g-polyurethane particles 124/130. Therefore, the CNM-g-polyurethane particles 124/130 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The CNM-g-polyurethane particles 124/130 may have a sintering window that is within 10° C., preferably within 5° C., of the sintering window of the polyurethane of the CNM-g-polyurethane.

The CNM-g-polyurethane particles 124/130 may have a melting point ranging from about 170° C. to about 200° C. (or from about 175° C. to about 195° C., or from about 180° C. to about 190° C., such as from about 185° C. to about 190° C.).

The CNM-g-polyurethane particles 124/130 may have a crystallization temperature ranging from about 130° C. to about 170° C. (or from about 135° C. to about 165° C., or from about 140° C. to about 160° C., such as from about 145° C. to about 155° C.).

The CNM-g-polyurethane particles 124/130 may have a crystallinity ranging from about 20% to about 40% (or from about 22% to about 38%, or from about 24% to about 36%, or from about 26% to about 34%, or from about 28% to about 32%, or from about 20% to about 30%, or from about 22% to about 28%).

The CNM-g-polyurethane particles 124/130 may have an MFI flow rate ranging from about 0.5 g/10 min to about 10 g/10 min (or from about 1 g/10 min to about 8 g/10 min, or from about 1.5 g/10 min to about 6 g/10 min, or from about 2 g/10 min to about 5 g/10 min).

The CNM-g-polyurethane particles 124/130 may provide a dimensional accuracy of the SLS parts ranging from 0.1% to about 5% (or from about 0.5% to about 4.5%, or from about 1% to about 4%).

The CNM-g-polyurethane particles 124/130 may have a tensile strength ranging from about 50 MPa to about 200 Mpa (or from about 60 MPa to about 150 Mpa, or from about 80 MPa to about 100 Mpa).

Tensile strength and dimensional accuracy of the SLS parts of CNM-g-polyurethane particles 124/130 of the present disclosure may be advantageously higher than that of typical polyurethane particle SLS parts with the same processing parameters.

The CNM-g-polyurethane particles 124/130 may have a tensile modulus (as fiber) ranging from about 400 MPa to about 1000 MPa (or from about 425 MPa to about 800 MPa, or from about 450 MPa to about 600 MPa, or from about 475 MPa to about 500 MPa, or from about 500 MPa to about 600 MPa).

The CNM-g-polyurethane particles 124/130 may have an ultimate strength ranging from about 50 MPa to about 500 Mpa (or from about 60 MPa to about 450 Mpa, or from about 70 MPa to about 400 Mpa, or from about 80 MPa to about 350 Mpa, or from about 90 MPa to about 300 Mpa, or from about 100 MPa to about 250 Mpa, or from about 50 MPa to about 150 Mpa, or from about 80 MPa to about 120 Mpa).

The CNM-g-polyurethane particles 124/130 may have a flexural modulus ranging from about 50 MPa to about 2000 Mpa (or from about 100 MPa to about 1500 Mpa, or from about 150 MPa to about 1000 Mpa, or from about 200 MPa to about 800 Mpa, or from about 500 MPa to about 1000 Mpa).

The CNM-g-polyurethane particles 124/130 may have an elongation at break ranging from about 2% to about 200% (or from about 4% to about 190%, or from about 6% to about 180%, or from about 8% to about 160%, or from about 10% to about 140%, or from about 15% to about 120%, or from about 20% to about 100%, or from about 50% to about 150%).

Applications of CNM-g-Polyurethanes

The present disclosure also relates to methods of selective laser sintering where the method may comprise: depositing (a) highly spherical polymer particles comprising (a1) CNM-g-polyurethane and optionally (a2) a thermoplastic polymer that is not the polyurethane of the CNM-g-polyurethane and is not grafted to a CNM and optionally (b) other thermoplastic polymer particles not comprising the CNM-g-polyurethane onto a surface; and once deposited, exposing at least a portion of the spherical polymer particles to a laser to fuse the polymer particles and form a consolidated body.

The CNM-g-polyurethane particles 124/130 described herein may be used to produce a variety of articles. By way of nonlimiting example, 3-D printing processes of the present disclosure may comprise: depositing CNM-g-polyurethane particles 124/130 described herein upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the polymer particles (e.g., CNM-g-polyurethane particles 124/130 and other thermoplastic polymer particles) may take place in a 3-D printing apparatus employing a laser, such that heating and consolidation take place by selective laser sintering.

Examples of articles that may be produced by such methods where the CNM-g-polyurethane particles 124/130 may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

EXAMPLE EMBODIMENTS

A first nonlimiting example embodiment of the present disclosure is a method of selective laser sintering, the method comprising: depositing carbon nanomaterial-graft-polyurethane (CNM-g-polyurethane) particles optionally in combination with other thermoplastic polymer particles onto a surface, wherein the CNM-g-polyurethane particles comprise a polyurethane grafted to a carbon nanomaterial (CNM); and once deposited, exposing at least a portion of the CNM-g-polyurethane particles to a laser to fuse the polymer particles thereof and form a consolidated body by selective laser sintering. The first nonlimiting example embodiment may further include one or more of: Element 1: wherein the CNM-g-polyurethane comprises about 50 wt % to about 99.95 wt % of the polyurethane, and about 0.05 wt % to about 50 wt % of the carbon nanomaterial, based on the total weight of the CNM-g-polyurethane; Element 2: wherein the polyurethane is grafted to the CNM by in situ polymerization, or by microwave-assisted solid state grafting; Element 3: wherein the polyurethane is a thermoplastic polyurethane (TPU); Element 4: wherein the polyurethane is produced from (a) a polyisocyanate component, (b) a polyol component, and (c) an optional chain extender component; Element 5: Element 4 and wherein the polyisocyanate component comprises an aromatic diisocyanate; Element 6: Element 4 and wherein the polyisocyanate component is selected from the group consisting of: 4,4'-methylenebis (phenyl isocyanate), toluene diisocyanate, 2,4-toluene diisocyanate, 2,6-toluene diisocyanate, or any combination thereof; Element 7: Element 4 and wherein the polyol component is selected from the group consisting of: a polyether polyol, a polyester polyol, a copolymer of polyether and polyester polyols, or any combination thereof; Element 8: Element 7 and wherein the polyol component comprises a poly(tetramethylene ether glycol), a polycaprolactone, a polyester adipate, a copolymer thereof, or any combination thereof; Element 9: Element 4 and wherein the chain extender component comprises a linear alkylene diol; Element 10: Element 9 and wherein the chain extender component is selected from the group consisting of: 1,4-butanediol, 1,12-dodecanediol, dipropylene glycol, or any combination thereof; Element 11: wherein the CNM is selected from the group consisting of a carbon nanotube, a graphite, a graphene, a fullerene, and any combinations thereof; Element 12: wherein a molar ratio of polyurethane to CMN is of about 500:1 to about 1:500; Element 13: wherein a molar ratio of polyurethane to CMN is of about 20:1 to about 10:1; Element 14: wherein the CNM-g-polyurethane particles have a circularity of about 0.90 to about 1.0; Element 15: wherein the CNM-g-polyurethane particles have an emulsion stabilizer embedded with an outer surface of the CNM-g-polyurethane particles; Element 16: Element 15 and wherein the emulsion stabilizer comprises nanoparticles; Element 17: Element 16 and wherein at least some of the CNM-g-polyurethane particles have a void comprising the emulsion stabilizer at a void/polymer interface; Element 18: Element 16 and wherein the emulsion stabilizer comprises nanoparticles and the nanoparticles are embedded in the void/polymer interface; Element 19: wherein the CNM-g-polyurethane particles further comprise: a thermoplastic polymer not grafted to a CNM; Element 20: wherein the CNM-g-polyurethane particles further comprise: a carrier fluid that is immiscible with the polyurethane of the CNM-g-polyurethane; Element 21: wherein CNM-g-polyurethane particles have a D10 of about 0.1 μm to about 125 μm, a D50 of about 0.5 μm to about 200 μm, and a D90 of about 3 μm to about 300 μm, and wherein D10<D50<D90; Element 22: wherein CNM-g-polyurethane particles have a diameter span of about 0.2 to about 10; Element 23: wherein CNM-g-polyurethane particles have an angle of repose of about 25° to about 45°; and Element 24: wherein CNM-g-polyurethane particles a Hausner ratio of about 1.0 to about 1.5.

A second nonlimiting example embodiment of the present disclosure is a composition comprising: CNM-g-polyurethane particles comprising a polyurethane grafted to a carbon nanomaterial. The CNM-g-polyurethane particles may include the CNM at about 0.05 wt % to about 50 wt % of the CNM-g-polyurethane particles, and the CNM may be selected from the group consisting of a carbon nanotube, a graphite, a graphene, a fullerene, and any combinations thereof. The second nonlimiting example embodiment may further include one or more of: Element 1; Element 2; Element 3; Element 5; Element 6; Element 9; Element 10; Element 10; Element 11; Element 12; Element 13; Element 14; Element 15; Element 16; Element 17; Element 18; Element 19; Element 20; Element 21; Element 22; and Element 23: wherein the polyurethane is a thermoplastic polyurethane (TPU) produced from (a) a polyisocyanate component, (b) a polyol component, and (c) an optional chain extender component.

A third nonlimiting example embodiment is a method comprising: (a) carbon nanomaterial-graft-polyurethane (CNM-g-polyurethane), wherein the CNM-g-polyurethane particles comprises: a polyurethane grafted to a carbon nanomaterial, (b) a carrier fluid that is immiscible with the polyurethane of the CNM-g-polyurethane, optionally (c) a thermoplastic polymer not grafted to a CNM, and optionally (d) an emulsion stabilizer at a temperature greater than a melting point or softening temperature of the polyurethane of the CNM-g-polyurethane and the thermoplastic polymer, when included, and at a shear rate sufficiently high to disperse the CNM-g-polyurethane in the carrier fluid; cooling the mixture to below the melting point or softening temperature to form CNM-g-polyurethane particles; and separating the CNM-g-polyurethane particles from the carrier fluid. The third nonlimiting example embodiment may further include one or more of: Element 1; Element 2; Element 3; Element 5; Element 6; Element 9; Element 10; Element 10; Element 11; Element 12; Element 13; Element 14; Element 15; Element 16; Element 17; Element 18; Element 19; Element 20; Element 21; Element 22; Element 23; Element 24: wherein the polyisocyanate component, the polyol component, and the optional chain extender component are combined at a molar ratio of 1:0.5:0.5; Element 25: wherein the carrier fluid is present at a weight ratio of the carrier fluid to a combination of the CNM-g-polyurethane and the thermoplastic polymer ranging from 50:50 to 90:10; and Element 26: wherein the carrier fluid is polydimethylsiloxane (PDMS).

CLAUSES

Clause 1. A method of selective laser sintering, the method comprising: depositing carbon nanomaterial-graft-polyurethane (CNM-g-polyurethane) particles optionally in combination with other thermoplastic polymer particles onto a surface, wherein the CNM-g-polyurethane particles comprise a polyurethane grafted to a carbon nanomaterial (CNM); and once deposited, exposing at least a portion of the CNM-g-polyurethane particles to a laser to fuse the polymer particles thereof and form a consolidated body by selective laser sintering.

Clause 2. The method of Clause 1, wherein the CNM-g-polyurethane comprises about 50 wt % to about 99.95 wt % of the polyurethane, and about 0.05 wt % to about 50 wt % of the carbon nanomaterial, based on the total weight of the CNM-g-polyurethane.

Clause 3. The method of Clause 1, wherein the polyurethane is grafted to the CNM by in situ polymerization, or by microwave-assisted solid state grafting.

Clause 4. The method of Clause 1, wherein the polyurethane is a thermoplastic polyurethane (TPU).

Clause 5. The method of Clause 1, wherein the polyurethane is produced from (a) a polyisocyanate component, (b) a polyol component, and (c) an optional chain extender component.

Clause 6. The method of Clause 5, wherein the polyisocyanate component comprises an aromatic diisocyanate.

Clause 7. The method of Clause 5, wherein the polyisocyanate component is selected from the group consisting of 4,4'-methylenebis(phenyl isocyanate), toluene diisocyanate, 2,4-toluene diisocyanate, 2,6-toluene diisocyanate, or any combination thereof.

Clause 8. The method of Clause 5, wherein the polyol component is selected from the group consisting of: a polyether polyol, a polyester polyol, a copolymer of polyether and polyester polyols, or any combination thereof.

Clause 9. The method of Clause 8, wherein the polyol component comprises a poly(tetramethylene ether glycol), a polycaprolactone, a polyester adipate, a copolymer thereof, or any combination thereof.

Clause 10. The method of Clause 5, wherein the chain extender component comprises a linear alkylene diol.

Clause 11. The method of Clause 10, wherein the chain extender component is selected from the group consisting of: 1,4-butanediol, 1,12-dodecanediol, dipropylene glycol, or any combination thereof.

Clause 12. The method of Clause 1, wherein the CNM is selected from the group consisting of a carbon nanotube, a graphite, a graphene, a fullerene, and any combinations thereof.

Clause 13. The method of Clause 1, wherein a molar ratio of polyurethane to CMN is of about 500:1 to about 1:500.

Clause 14. The method of Clause 1, wherein a molar ratio of polyurethane to CMN is of about 20:1 to about 10:1.

Clause 15. The method of Clause 1, wherein the CNM-g-polyurethane particles have a circularity of about 0.90 to about 1.0.

Clause 16. The method of Clause 1, wherein the CNM-g-polyurethane particles have an emulsion stabilizer embedded with an outer surface of the CNM-g-polyurethane particles.

Clause 17. The method of Clause 16, wherein the emulsion stabilizer comprises nanoparticles.

Clause 18. The method of Clause 17, wherein at least some of the CNM-g-polyurethane particles have a void comprising the emulsion stabilizer at a void/polymer interface.

Clause 19. The method of Clause 17, wherein the emulsion stabilizer comprises nanoparticles and the nanoparticles are embedded in the void/polymer interface.

Clause 20. The method of Clause 1, wherein the CNM-g-polyurethane particles further comprise: a thermoplastic polymer not grafted to a CNM.

Clause 21. The method of Clause 1, wherein the CNM-g-polyurethane particles further comprise: a carrier fluid that is immiscible with the polyurethane of the CNM-g-polyurethane.

Clause 22. The method of Clause 1, wherein CNM-g-polyurethane particles have a D10 of about 0.1 µm to about 125 µm, a D50 of about 0.5 µm to about 200 µm, and a D90 of about 3 µm to about 300 µm, and wherein D10<D50<D90.

Clause 23. The method of Clause 1, wherein CNM-g-polyurethane particles have a diameter span of about 0.2 to about 10.

Clause 24. The method of Clause 1, wherein CNM-g-polyurethane particles have an angle of repose of about 25° to about 45°.

Clause 25. The method of Clause 1, wherein CNM-g-polyurethane particles a Hausner ratio of about 1.0 to about 1.5.

Clause 26. A composition comprising: CNM-g-polyurethane particles comprising a polyurethane grafted to a carbon nanomaterial. The CNM-g-polyurethane particles may include the CNM at about 0.05 wt % to about 50 wt % of the CNM-g-polyurethane particles, and the CNM may be selected from the group consisting of a carbon nanotube, a graphite, a graphene, a fullerene, and any combinations thereof.

Clause 27. The composition of Clause 26, wherein the polyisocyanate component, the polyol component, and the optional chain extender component are combined at a molar ratio of 1:0.5:0.5.

Clause 28. The composition of Clause 26, wherein the CNM-g-polyurethane comprises about 50 wt % to about 99.95 wt % of the polyurethane, and about 0.05 wt % to about 50 wt % of the carbon nanomaterial, based on the total weight of the CNM-g-polyurethane.

Clause 29. The composition of Clause 26, wherein the CNM-g-polyurethane particles further comprise: a carrier fluid that is immiscible with the polyurethane of the CNM-g-polyurethane.

Clause 30. The composition of Clause 26, wherein the carrier fluid is present at a weight ratio of the carrier fluid to a combination of the CNM-g-polyurethane and the thermoplastic polymer ranging from 50:50 to 90:10.

Clause 31. The composition of Clause 26, wherein the carrier fluid is polydimethylsiloxane (PDMS).

Clause 32. The composition of Clause 26, wherein the polyurethane is a thermoplastic polyurethane (TPU) produced from (a) a polyisocyanate component, (b) a polyol component, and (c) an optional chain extender component.

Clause 33. A method comprising: mixing a mixture comprising: (a) carbon nanomaterial-graft-polyurethane (CNM-g-polyurethane), wherein the CNM-g-polyurethane particles comprises: a polyurethane grafted to a carbon nanomaterial, (b) a carrier fluid that is immiscible with the polyurethane of the CNM-g-polyurethane, optionally (c) a thermoplastic polymer not grafted to a CNM, and optionally (d) an emulsion stabilizer at a temperature greater than a melting point or softening temperature of the polyurethane of the CNM-g-polyurethane and the thermoplastic polymer, when included, and at a shear rate sufficiently high to disperse the CNM-g-polyurethane in the carrier fluid; cooling the mixture to below the melting point or softening temperature to form CNM-g-polyurethane particles; and separating the CNM-g-polyurethane particles from the carrier fluid.

Clause 34. The method of Clause 33, wherein the polyurethane is a thermoplastic polyurethane (TPU) produced from (a) a polyisocyanate component, (b) a polyol component, and (c) an optional chain extender component.

Clause 35. The method of Clause 34, wherein the polyisocyanate component, the polyol component, and the optional chain extender component are combined at a molar ratio of 1:0.5:0.5.

Clause 36. The method of Clause 33, wherein the CNM-g-polyurethane comprises about 50 wt % to about 99.95 wt % of the polyurethane, and about 0.05 wt % to about 50 wt % of the carbon nanomaterial, based on the total weight of the CNM-g-polyurethane.

Clause 37. The method of Clause 33, wherein the carrier fluid is present at a weight ratio of the carrier fluid to a combination of the CNM-g-polyurethane and the thermoplastic polymer ranging from 50:50 to 90:10.

Clause 38. The method of Clause 33, wherein the carrier fluid is polydimethylsiloxane (PDMS).

Clause 39. The method of Clause 33, wherein CNM-g-polyurethane particles have a D10 of about 0.1 µm to about 125 µm, a D50 of about 0.5 µm to about 200 µm, and a D90 of about 3 µm to about 300 µm, and wherein D10<D50<D90.

Clause 40. The method of Clause 33, wherein CNM-g-polyurethane particles have a diameter span of about 0.2 to about 10.

Clause 41. The method of Clause 33, wherein CNM-g-polyurethane particles have an angle of repose of about 25° to about 45°.

Clause 42. The method of Clause 33, wherein CNM-g-polyurethane particles a Hausner ratio of about 1.0 to about 1.5.

Clause 43. The method of Clause 33, wherein the CNM-g-polyurethane particles have a circularity of about 0.90 to about 1.0.

Clause 44. The method of Clause 33, wherein the CNM-g-polyurethane particles have an emulsion stabilizer embedded with an outer surface of the CNM-g-polyurethane particles.

Clause 45. The method of Clause 33, wherein the emulsion stabilizer comprises nanoparticles.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the disclosure.

EXAMPLES

Example 1. General In Situ TPU Polymerization without CNM

A general in situ neat TPU polymerization (no carbon source) is described. A molar ratio of diisocyanate, polyol and chain extender of 1.02:0.5:0.5 (the ratio may be modified to obtain different properties) can be used. Polyetherpolyol and 1,4-butanediol can be dried overnight at 50° C., and 4,4'-methylenebis (phenylisocyanate) (MDI) can be dried at room temperature for 1 h in vacuum oven to remove the traces of moisture. The pre-polymer can be prepared by reacting MDI with polyol for 2 h at 80° C. in dry DMF, with stirring in a three-neck round bottom flask, under nitrogen sweep, with a solids content of 20%. The temperature can be maintained using an oil bath. Conversion of —OH groups can be verified by titration of NCO groups.

Example 2. General In Situ TPU Polymerization with CNM

A molar ratio of diisocyanate, polyol, and chain extender may be 1.02:0.5:0.5 (the ratio may be modified to obtain different properties). Polyetherpolyol and 1,4-butanediol may be dried overnight at 50° C., and 4,4'-methylenebis (phenylisocyanate) (MDI) may be dried at room temperature for 1 h in vacuum oven to remove any traces of moisture. The pre-polymer may be prepared by reacting MDI with polyol for 2 h at 80° C. in dry DMF with stirring in a three-neck round bottom flask under nitrogen sweep, with a solids content of 20%. The temperature may be maintained at 80° C. using an oil bath. Conversion of —OH groups may be verified by titration of NCO groups. The 1,4-butanediol and $2.3 \times 10^{-7}$ mol/cm$^3$ dibutyltinlaurate catalyst may be added to the reaction vessel in dry DMF at 80° C., under continued nitrogen stream. After 6 minutes of chain extension, the calculated amount of modified carbon source may be added to the reaction vessel. The reaction may be stirred for an additional 2 h, and the resulting viscous mixture may be then poured into a mold to evaporate the DMF. Once the DMF is evaporated, the residual solvent may be removed by placing the polymer in a vacuum oven at 50° C. overnight. Notwithstanding, the CNM may be added prior to the addition of the polyol, prior to the addition of the chain extender, or after the completion of the polymerization.

Example 3

Figure 2:
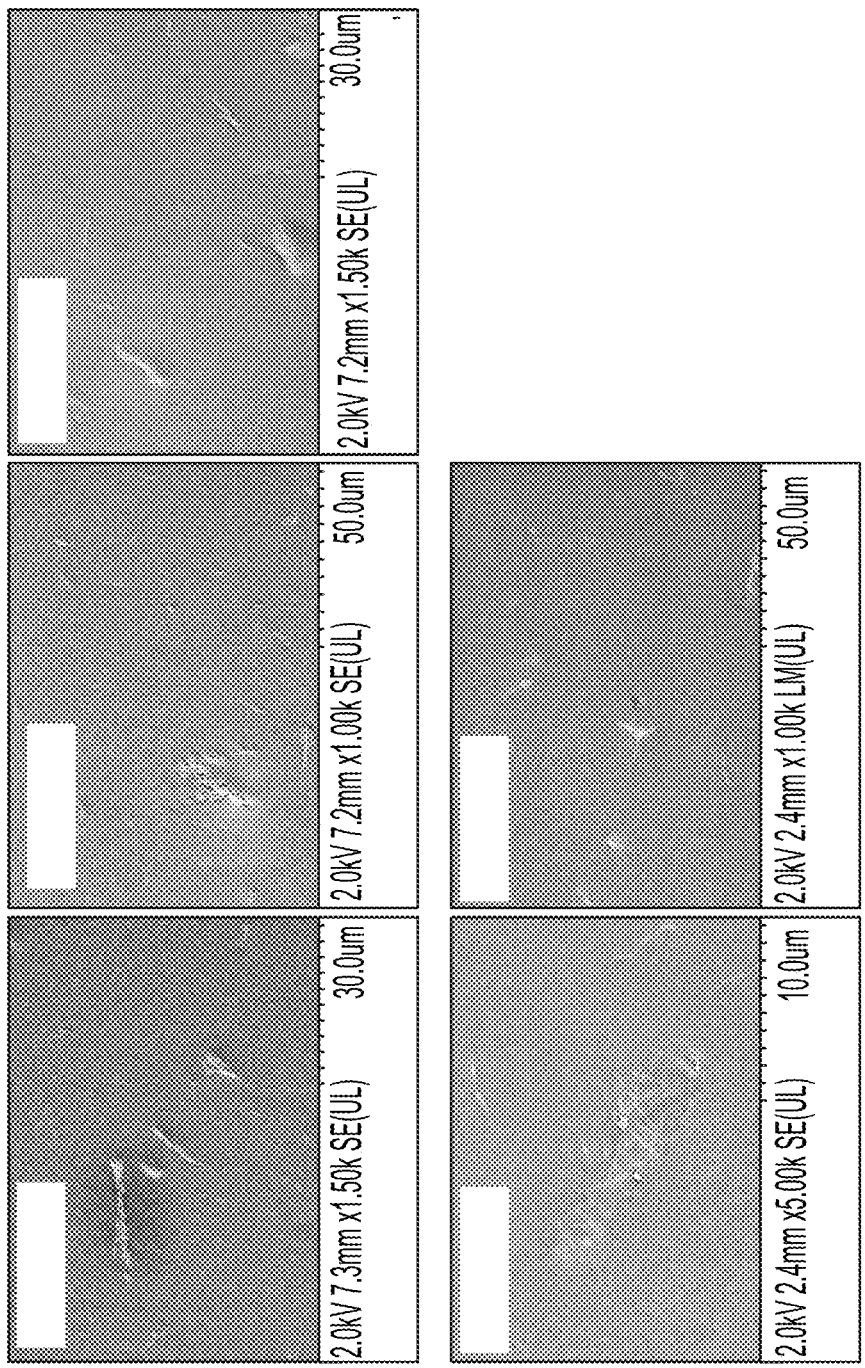
FIG. 2 is scanning electron microscope (SEM) cross sectional images of a carbon nanomaterial-grafted-polyurethane.

FIG. 2 is a nonlimiting example of Scanning Electron Microscope (SEM) cross sectional images of a graphene oxide-grafted-polyurethane, synthesized TPU (MDI, p(THF), 1,4-BD) 0.5% graphene oxide, prepared as follow: the molar ratio of diisocyanate, polyol and chain extender was 1.02:0.5:0.5 (the ratio may be modified to obtain different properties). Polyetherpolyol and 1,4-butanediol were dried overnight at 50° C. and MDI was dried at room temperature for 1 h in vacuum oven to remove the traces of moisture. Graphene oxide was dried for 3 hours at 50° C. in vacuum oven. To a three-neck round bottom flask equipped with argon inlet was added poly(tetrahydrofuran) (10 g, 0.01 mol, 1000 kDa), methylene diphenyl diisocyanate (MDI, 5.2 g, 0.0204 mol), and 55 mL of dry DMF. The reaction mixture was heated to 80° C. and then allowed to react under vigorous stirring for 2 hours to obtain the prepolymer. Separately, graphene oxide (0.08 g) was mixed with 10 mL of DMF and sonicated for 1 hour to give a stable dispersion of GO. After 2 hours at 80° C., 1,4-butanediol (0.9 g, 0.01 mol) with 5 mL dry DMF and one drop of dibutyltinlaurate catalyst were added to reaction vessel in dry DMF keeping reaction temperature at 80° C. under continued argon. After 5 minutes of chain extension the GO dispersion was added to the reaction mixture. The reaction was vigorously stirred for an additional 2 hours, and the viscous mixture was then poured into a Teflon lined mold to evaporate the DMF. Once the DMF had been evaporated, the residual solvent was removed by placing the polymer in a vacuum oven at 50° C. overnight. The (SEM) cross sectional images in FIG. 2 show good dispersion throughout TPU matrix.

Prophetic Example 1. Microwave-Assisted Solid State Grafting

1) Surface modification via microwave radiation is described. Prior to synthesis the polymer composite, the CNTs may be carboxylated, Carboxylation of CNTs may be performed by treating the CNTs in a mixture of concentrated sulfuric acid and nitric acid via microwave radiation, which may be accomplished by combining 1 g of CNTs and 100 mL of a 1:1 concentrated $H_2SO_4$ and concentrated $HNO_3$. The flask may then be subjected to microwave radiation at 140° C. for 10 minutes. After the acid treatment, the CNTs may be transferred into a beaker, followed by the addition of 100 mL deionized (DI) water, and the mixture cooled down to room temperature. The oxidized product may be filtered using a Teflon membrane with a pore size of 0.22 The resulting carboxylated CNT products may be washed with DI water until a neutral pH is reached and then dried in a vacuum oven.

2) Grafting of carboxylated CNTs via microwave radiation (5 wt % CNTs) is described. 1 g of carboxylated CNTs may be dispersed in 10 mL of THF via ultrasonication. In a separate container, 20 g of TPU may be dissolved in 100 mL of THF. When the carboxylated CNTs are well dispersed they may be added dropwise to the TPU solution with stirring. Stirring may be continued until a homogenous mixture is obtained. The mixture may then be poured into a mold and the solvent evaporated. The mixture of TPU and carboxylated CNTs mixture can then be treated under microwave radiation for 5 min, with 50% total power output (50% of 800 W).

Prophetic Example 2. Fullerene (Hydroxyl Modified)

1) Surface modification of fullerene is described. Fullerene soot may initially be annealed at 450° C. for 4 h. The pristine fullerene may then undergo oxidation to functionalize the surface of the molecules. Oxidation of fullerenes may be carried out by refluxing with concentrated nitric acid. 1.5 g of pristine fullerene $C_{60}$ may be refluxed at 120° C. with 70 ml concentrated $HNO_3$ solution for 48 h. The mixture may then be diluted with distilled water and filtered using, for example, a Teflon membrane with a pore size of 0.45 The oxidized material may then be washed with distilled water until a neutral pH is reached, then dried under vacuum to remove residual water. The dried, hydroxyl functionalized fullerene powder may then be used in polymerization reactions.

2) Grafting hydroxyl functionalized fullerene to TPU via in-situ polymerization is described. Depending on when the functionalized fullerene may be added to the polymerization, the material may be used to graft to the polymer backbone or to endcap the polymer chains (see in-situ polymerization with carbon source above).

Prophetic Example 3. Nanotubes (PCL-CNTs)

1) Oxidation of CNTs is described. The carbon nanotubes (CNTs) may be oxidized before further treatment can occur. This transformation may be achieved by dispersing 1 g of raw CNTs in 100 ml mixture of concentrated sulfuric acid and nitric acid in a ratio of 3:1 using an ultrasonicator. The mixture may then be heated gradually to 90° C. and may be stirred for 30 minutes. After the reaction is completed, the mixture may be diluted with DI water and filter via Teflon membrane. The product may then be washed with DI water until a neutral pH is reached, and then dried in a vacuum oven.

2) Acid chloride functionalization of the CNTs surface is described. Prior to grafting the oxidized CNT to polyurethanes/polyols via excess hydroxyl groups, the oxidized CNT may be further functionalized with thionyl chloride ($SOCl_2$). 1 g of the oxidized CNTs may be dispersed in 10 mL $SOCl_2$ with ultrasonication. The mixture may then be heated slowly to 65° C. and kept under reflux for 1 day with stirring. Then, the mixture may be filtered via a 0.22 µm Teflon membrane. Dry acetone may then be used to wash the product to obtain the acid chloride intermediate.

3) Grafting to poly(ε-caprolactone) (PCL)-diol/general polyol. The solid acid chloride functionalized CNT may be immediately transferred into a solution of PCL-diol (average Mn of 530 g/mol to 2,000 g/mol) in dry THF, and stirred at 60° C. for 24 h. The resulting reaction mixture may be filtered, washed and dried to obtain the polyol grafted CNTs. This method may also be used to cap TPUs that contain hydroxyl end groups.

4) Grafting polyol functionalized CNTs to TPU via in-situ polymerization. The polyol functionalized CNTs may then be used in an in-situ TPU polymerization in order to graft the nanotubes onto the polymer chains (see polymerization procedure described above). The material may also be used to endcap the polymer if added after the completion of the polymerization, and if isocyanate groups are present in excess.

Prophetic Example 4. Graphene (Isocyanate Modified)

1) Isocyanate functionalization of graphene oxide (GO) is described. GO may be first dispersed in water via ultrasonication for 1 h, and may be followed by centrifugation for 10 min at 4,000 rpm. The GO suspension may then be subjected to a solvent-exchange process to obtain a dispersion of GO in DMF. The solvent-exchange process may be performed by adding DMF to the aqueous GO, followed by ultrasonication, centrifugation, and then removal of the supernatant liquid. This process should be repeated 3 times. Next, the GO may be reacted with an aliphatic polyisocyanate (PI) (e.g., DESMODUR® N75) to produce the isocyanate-functionalized GO. The GO (1 g) may be added to a 250-mL round-bottom flask equipped with a magnetic stir bar, at a speed of 200 rpm and a flow of nitrogen. 100 mL anhydrous DMF may be added, and the mixture stirred until a homogeneous suspension is formed. Next, 40 mmol of PI may be added to the suspension and the mixture stirred under nitrogen for 72 h at 50° C. Following the reaction, the mixture may then be poured into dichloromethane (DCM) to coagulate the product, i.e., the polyisocyanate-functionalized graphene oxide (PI-GO). The PI-GO product may then filtered and washed with additional DCM.

2) Method for grafting the polyisocyanate-functionalized graphene oxide (PI-GO) to TPU via in-situ polymerization is described. A calculated amount of PI-GO may be dispersed in dry DMF by sonicating for 30 minutes. Upon formation of a homogenous solution, the resulting mixture may be transferred to a 2 liters 3-neck round bottomed flask equipped with a condenser and a nitrogen purge. To the flask, may be added methylene diphenyl diisocyanate and poly(tetrahydrofuran) (Mw of about 1000 g/mol) (at a molar ratio of 1:0.5) and dry DMF (20 wt % solids reaction). The reaction mixture may be heated to 80° C. for 2 h. Next, 1,4-butanediol (0.5 equivalents) and $2.3 \times 10^{-7}$ mol/cm$^3$ dibutyltinlaurate catalyst may be added to the reaction vessel in dry DMF at 80° C. under continued stream of nitrogen. The mixture may be stirred for an additional 2 h, at 80° C. Upon completion, the reaction vessel may be degassed via vacuum until no more bubbles are seen, and the viscous polymer solution may be poured into an aluminum pan to evaporate the solvent.

Prophetic Example 5. Modified CNMs Grafted Polyurethane Via CNM Grafted 4,4'-Methylene Bis(Phenylisocyanate) (MDI) and Polyurethane Pre-Polymers A GO may be reacted directly with a diisocyanate monomer prior to the polymerization reaction. A 0.033 wt % GO composite may be prepared by dispersing 50 mg of GO in 500 g of dry DMF with ultrasonication at room temperature for 30 min. The homogenous solution may then be added to a 1 liter flask equipped with a condenser and nitrogen purge. Next, 36 g of MDI may be added to the GO dispersion, and may be heated to 80° C. The solution may be stirred for 2 hours in order to attach the GO sheets to the MDI monomer. Then, 64 g of poly(tetrahydrofuran) (1000 Mw) may be added into the flask and the mixture may be stirred at 80° C. for an additional 2 hours to prepare the polyurethane pre-polymer with grafted graphene oxide nanosheets. Next, 5.75 g 1,4-butanediol (chain extender) and $2.3 \times 10^{-7}$ mol/cm$^3$ dibutyltinlaurate catalyst may be added to reaction vessel in dry DMF at 80° C. under continued nitrogen. The mixture may be stirred for an additional 2 hours 80° C. Upon completion of the reaction, the reaction vessel may be degassed via vacuum until no more bubbles are seen and then viscous polymer solution may be poured into an aluminum pan to evaporate solvent.

Prophetic Example 6. In-Situ Polymerization with Amine-Modified Carbon Source

1) Preparation of amino-functionalized carbon nanotubes is described. The multiwalled carbon nanotubes (MWCNT) may be first oxidized via a mixture of concentrated sulfuric acid with nitric acid at a volume ratio of 3:1. The acidification may take place with sonication of the MWCNT in the acid solution at 50° C. for 3 hours in an ultrasonic bath. The MWCNT/acid mixture may then be poured into deionized water, filtered, and washed repeatedly until the pH value of the filtration solution may be around 7 (neutral pH). The acidified MWCNT product may then be dried in a vacuum oven at 80° C. for 6 hours. About 1 g of MWCNT-COOH may be dispersed in 2 liters of THF under sonication for at least 1 hour. To this dispersion, while stirring at ambient temperature, may be added 20 g (340 mmol) ethylenediamine (EDA), 1 g (10 mmol) 4-(dimethylamino) pyridine (DMAP), and 10 g (50 mmol) N,N'-dicyclohexylcarbodiimide (DCC). The dispersion/solution may be heated to 60° C. and the temperature may be maintained at 60° C. for 24 hours with stirring. The product may be a black solid that may be collected easily and washed three times with THF (1 liter to 1.5 liters per wash). The product may be dried in a vacuum oven to obtain the functionalized MWCNT.

2) Method for grafting amine functionalized CNTs to TPU via in-situ polymerization is described. 1 g of amine functionalized CNTs may be dispersed in dry DMF (50 mL) via ultrasonication for 30 minutes. Once a homogenous solution is obtained, the solution may be added to a 1 liter 3-necked round bottom flask equipped with a magnetic stirrer, condenser, and a nitrogen purge. Then, 340 mL of dry DMF, MDI (32.5 g, 0.127 mol) and poly(tetrahydrofuran) (1000 Mw, 62.0 g, 0.062 mol) may be added. The reaction may be set to 80° C. for 2 hours. In a separate vessel, 1 g of amine functional nanotubes may be dispersed in dry DMF (50 mL) via ultrasonication. After 2 hours, 1,4-butane diol (5.6 g, 0.062 mol) and $2.3 \times 10^{-7}$ mol/cm$^3$ dibutyltinlaurate catalyst may be added to the 1 liter flask. The reaction may be stirred for an additional 2 hours, and the viscous mixture may then be poured into an aluminum pan to evaporate the DMF. Once the DMF has been evaporated the residual solvent may be removed by placing the polymer in a vacuum oven at 50° C. overnight.

Prophetic Example 6. Preparation of CNM-g-Polyurethane Microparticles (e.g., CNT, GO, Fullerene, Etc.) by Melt Emulsification The CNM-g-polyurethane microparticles may be produced from CNM-g-polyurethane nanocomposites (prepared as described in Examples 1 through 6), by melt extrusion in a HAAKE™ RHEOMIX twin screw extruder with high shear rotors. The extruder may be brought to a temperature around the melting point of the polymer, and the rotors may be started at a slow speed. The TPU-Carbon polymer pellets produced from the CNM-g-polyurethane nanocomposites (prepared as described in Examples 1 through 6) may be added to the heated extruder, followed by the addition of the carrier fluid. The carrier fluid may be PDMS oil with a viscosity of 10,000-60,000 cSt at room temperature. The ratio of PDMS oil to polymer may be 70:30 or 30% polymer solids in 70% oil. An optional dispersing agent or flow aid may be added prior to the carrier fluid to aid with the flow of the dried particles. At 200° C., the extruder may be operated at 200 rpm (maximum speed) for 30 min. The mixture may then be discharged onto a metal tray with dry ice to provide rapid quench cooling. Upon complete sublimation of the dry ice, the oil may be washed away from the microparticles with three heptane washes, and the microparticles may be isolated by vacuum filtration. The microparticles may then be dried overnight in a vacuum oven at room temperature to allow any residual heptane to evaporate. The dried particles may then be sieved through a 150 μm or 250 μm screen. The resulting powder may have a final average particle size (D50) of approximately 50 microns and a span of approximately 1.000. The span is calculated as the difference between the D90 and the D10 divided by the D50, and is a measure of particle size distribution.

Prophetic Example 7. SLS Printing and Mechanical Testing

The baseline performance of the dried powders may be determined by sintering the material using a SNOWWHITE SLS printer (available from Sharebot). The laser selectively may fuse the material by scanning cross-sections of the desired object generated using a computer-aided design (CAD) model. After the first layer is scanned, the powder bed may be lowered, new powder material may be rolled on top and the subsequent layer may be scanned until the part is completed. The main advantage of this powder-based system, when compared with other additive manufacturing techniques, is the elimination of printing supports and the ability to reuse materials.

Therefore, the present disclosure is well adapted to attain the ends and advantages mentioned as well as those that are inherent therein. The particular examples and configurations disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present disclosure. The present disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:
1. A method of selective laser sintering, comprising:
depositing carbon nanomaterial-graft-polyurethane (CNM-g-polyurethane) particles optionally in combination with other thermoplastic polymer particles onto a surface, wherein the CNM-g-polyurethane particles comprise a polyurethane grafted to a carbon nanomaterial (CNM), and the CNM-g-polyurethane particles have a circularity of about 0.90 to about 1.0;
wherein the polyurethane is produced from (i) a polyisocyanate component, (ii) a polyol component, and (iii) a chain extender component different from the polyol component, and the chain extender component comprising a linear alkylene diol; and
once deposited, exposing at least a portion of the CNM-g-polyurethane particles to a laser to form a consolidated body by selective laser sintering.

2. The method of claim 1, wherein the CNM-g-polyurethane comprises about 50 wt % to about 99.95 wt % of the polyurethane, and about 0.05 wt % to about 50 wt % of the carbon nanomaterial, based on a total weight of the CNM-g-polyurethane.

3. The method of claim 1, wherein the polyurethane is grafted to the CNM by in situ polymerization, or by microwave-assisted solid state grafting.

4. The method of claim 1, wherein the polyurethane is a thermoplastic polyurethane (TPU).

5. The method of claim 1, wherein the polyisocyanate component comprises an aromatic diisocyanate.

6. The method of claim 1, wherein the polyisocyanate component is selected from the group consisting of 4,4'-methylenebis (phenyl isocyanate), toluene diisocyanate, 2,4-toluene diisocyanate, 2,6-toluene diisocyanate, and any combination thereof.

7. The method of claim 1, wherein the polyol component is selected from the group consisting of a polyether polyol, a polyester polyol, a copolymer of polyether and polyester polyols, and any combination thereof.

8. The method of claim 7, wherein the polyol component comprises a poly (tetramethylene ether glycol), a polycaprolactone, a polyester adipate, a copolymer thereof, or any combination thereof.

9. The method of claim 1, wherein the chain extender component is selected from the group consisting of 1,4-butanediol, 1,12-dodecanediol, and any combination thereof.

10. The method of claim 1, wherein the CNM is selected from the group consisting of a carbon nanotube, a graphite, a graphene, a fullerene, and any combination thereof.

11. The method of claim 1, wherein a molar ratio of the polyurethane to the CNM is about 500:1 to about 1:500.

12. The method of claim 1, wherein a molar ratio of the polyurethane to the CNM is about 20:1 to about 10:1.

13. The method of claim 1, wherein the CNM-g-polyurethane particles further comprise an emulsion stabilizer comprising nanoparticles, and the nanoparticles are embedded in an outer surface of the CNM-g-polyurethane particles.

14. The method of claim 1, wherein the CNM-g-polyurethane particles further comprise:
a thermoplastic polymer not grafted to a CNM.

15. The method of claim 1, wherein CNM-g-polyurethane particles have an angle of repose of about 25° to about 45°.

16. The method of claim 1, wherein CNM-g-polyurethane particles have a Hausner ratio of about 1.0 to about 1.5.

17. A method comprising:
shearing a mixture comprising: (a) a carbon nanomaterial-graft-polyurethane (CNM-g-polyurethane), wherein the CNM-g-polyurethane comprises a polyurethane grafted to a carbon nanomaterial, and the polyurethane is produced from (i) a polyisocyanate component, (ii) a polyol component, and (iii) a chain extender component different from the polyol component, and the chain extender component comprising a linear alkylene diol; (b) a carrier fluid that is immiscible with the polyurethane of the CNM-g-polyurethane, optionally (c) a thermoplastic polymer not grafted to a CNM, and optionally (d) an emulsion stabilizer at a temperature greater than a melting point or softening temperature of the polyurethane of the CNM-g-polyurethane and the thermoplastic polymer, when included, and at a shear rate sufficiently high to disperse the CNM-g-polyurethane in the carrier fluid as a polymer melt comprising droplets that are emulsified in the carrier fluid;
cooling the mixture to below the melting point or softening temperature to form CNM-g-polyurethane particles having a circularity of about 0.90 to about 1.0; and
separating the CNM-g-polyurethane particles from the carrier fluid.

18. The method of claim 13, wherein the nanoparticles comprise oxide nanoparticles comprising a metal.

19. The method of claim 1, wherein a molar ratio of the polyisocyanate component to the polyol component to the chain extender component ranges from about 5.0:1.0:0.1 to about 1:1:1.

* * * * *